US010339335B2

(12) United States Patent
Sawada

(10) Patent No.: US 10,339,335 B2
(45) Date of Patent: *Jul. 2, 2019

(54) SEMICONDUCTOR DEVICE

(71) Applicant: Renesas Electronics Corporation, Tokyo (JP)

(72) Inventor: Seiji Sawada, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/105,231

(22) Filed: Aug. 20, 2018

(65) Prior Publication Data

US 2018/0357441 A1 Dec. 13, 2018

Related U.S. Application Data

(63) Continuation of application No. 14/909,970, filed as application No. PCT/JP2013/071954 on Aug. 15, 2013, now Pat. No. 10,073,982.

(51) Int. Cl.
G06F 21/62 (2013.01)
G06F 3/06 (2006.01)
(Continued)

(52) U.S. Cl.
CPC ........ *G06F 21/6218* (2013.01); *G06F 3/0623* (2013.01); *G06F 3/0638* (2013.01);
(Continued)

(58) Field of Classification Search
CPC .. G06F 3/0683; G06F 21/6218; G06F 3/0623; G06F 12/1408; G06F 21/85
See application file for complete search history.

(56) References Cited

U.S. PATENT DOCUMENTS 6,266,271 B1* 7/2001 Kawamura ............ G11C 16/22
365/185.04
6,490,685 B1 12/2002 Nakamura
(Continued)

FOREIGN PATENT DOCUMENTS

JP H11-175403 A 7/1999
JP 2007-519055 A 7/2007
(Continued)

OTHER PUBLICATIONS

International Search Report (ISR) (PCT Form PCT/ISA/210), in PCT/JP2013/071954, dated Oct. 8, 2013.
(Continued)

*Primary Examiner* — Kenneth W Chang
(74) *Attorney, Agent, or Firm* — McGinn IP Law Group, PLLC

(57) ABSTRACT

A semiconductor device includes a first storage unit including twin cells which are electrically rewritable and complementarily store 1-bit data based on a difference in a threshold voltage, a second storage unit including a memory cell which is electrically rewritable, data stored in the memory cell being erased when data in the twin cells is erased, at least one scrambler subjecting first data to a scramble processing by using scramble data to generate second data, a first write circuit which writes the second data into the twin cells in the first storage unit, a second write circuit which writes the scramble data into the memory cell in the second storage unit, and at least one descrambler subjecting the second data read from the first storage unit to a descramble processing by using the scramble data read from the second storage unit.

7 Claims, 18 Drawing Sheets

(51) Int. Cl.
*G06F 12/14* (2006.01)
*G11C 16/04* (2006.01)
*G06F 21/85* (2013.01)
*G11C 7/10* (2006.01)
*G11C 16/34* (2006.01)
*G11C 16/06* (2006.01)

(52) U.S. Cl.
CPC ........ *G06F 3/0683* (2013.01); *G06F 12/1408* (2013.01); *G06F 21/85* (2013.01); *G11C 7/1012* (2013.01); *G11C 7/1087* (2013.01); *G11C 16/04* (2013.01); *G11C 16/0475* (2013.01); *G11C 16/3427* (2013.01); *G11C 16/06* (2013.01)

(56) References Cited

U.S. PATENT DOCUMENTS

| | | | |
|---|---|---|---|
| 7,957,195 | B2 | 6/2011 | Fujito |
| 8,325,519 | B2* | 12/2012 | Liu .................... G11C 16/0416 365/185.03 |
| 8,341,333 | B2 | 12/2012 | Takada |
| 8,341,500 | B2* | 12/2012 | Byom .................... G11C 16/26 365/185.33 |
| 8,413,016 | B2 | 4/2013 | Honda |
| 2002/0129245 | A1 | 9/2002 | Cassagnol |
| 2005/0078514 | A1* | 4/2005 | Scheuerlein ............. G11C 8/10 365/185.05 |
| 2006/0130156 | A1 | 6/2006 | Ng et al. |
| 2006/0232826 | A1 | 10/2006 | Bar-El |
| 2008/0052446 | A1 | 2/2008 | Lasser |
| 2008/0089146 | A1 | 4/2008 | Fujito et al. |
| 2009/0172266 | A1 | 7/2009 | Kimura |
| 2009/0204824 | A1 | 8/2009 | Lin et al. |
| 2009/0222688 | A1 | 9/2009 | Kurashige |
| 2009/0316490 | A1 | 12/2009 | Takada |
| 2010/0080058 | A1 | 4/2010 | Fujito et al. |
| 2010/0275094 | A1 | 10/2010 | Honda |
| 2011/0035539 | A1 | 2/2011 | Honda |
| 2011/0113293 | A1 | 5/2011 | Ikeda |
| 2011/0208904 | A1 | 8/2011 | Fujito et al. |
| 2012/0033495 | A1 | 2/2012 | Kato |
| 2012/0297271 | A1 | 11/2012 | Sommer |
| 2014/0006688 | A1* | 1/2014 | Yu ......................... G11C 16/10 711/103 |

FOREIGN PATENT DOCUMENTS

| | | |
|---|---|---|
| JP | 2008-117510 A | 5/2008 |
| JP | 2008-204507 A | 9/2008 |
| JP | 2009-157841 A | 7/2009 |
| JP | 2010-512560 A | 4/2010 |
| JP | H 4498370 B2 | 7/2010 |
| JP | 2010-277584 A | 12/2010 |
| JP | 2011-028741 A | 2/2011 |
| JP | 2011-508363 A | 3/2011 |

OTHER PUBLICATIONS

Japanese Office Action dated Mar. 7, 2017, with an English translation.
Japanese Office Action dated May 16, 2017, in Japanese Application No. 2015-531706 with an English translation.
Breuil, et al., "A New Scalable Seif-Aligned Dual Bit Split-Gate Charge-Trapping Memory Device", Oct. 2005, IEEE Transactions on Electron Devices, vol. 52, No. 10, pp. 2250-2257.
Office Action dated Oct. 31, 2017 in U.S. Appl. No. 14/909,970.
Notice of Allowance dated May 7, 2018 in U.S. Appl. No. 14/909,970.

* cited by examiner

FIG.5
(a)
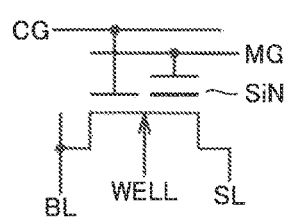
| | BL | CG | MG | SL | WELL | |
|---|---|---|---|---|---|---|
| READ | 1.5V | 1.5V | 0V | 0V | 0V | |
| RAISE Vth | 0V | 0.9V | 10V | 6V | 0V | (FOR EACH BIT) |
| LOWER Vth | Hi-Z | Open | -10V | 6V | 0V | (BATCH) |
(b)
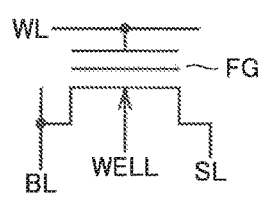
| | BL | WL | SL | WELL | |
|---|---|---|---|---|---|
| READ | 1.5V | 1.5V | 0V | 0V | |
| RAISE Vth | 6V | 10V | 0V | 0V | (FOR EACH BIT) |
| LOWER Vth | 10V | -10V | 10V | 10V | (BATCH) |
(c)
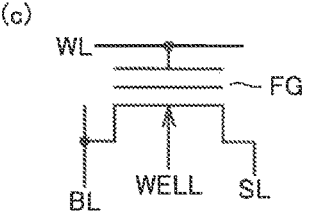
| | BL | WL | SL | WELL | |
|---|---|---|---|---|---|
| READ | 1.5V | 1.5V | 0V | 0V | |
| RAISE Vth | -10V | 10V | -10V | -10V | (BATCH) |
| LOWER Vth | 10V | -10V | 0V | 0V | (FOR EACH BIT) |

SEMICONDUCTOR DEVICE

The present application is a Continuation Application of U.S. patent application Ser. No. 14/909,970, filed on Feb. 3, 2016, which is based on International Application No. PCT/JP2013/071954, filed on Aug. 15, 2013, the entire contents of which are incorporated herein by reference.

TECHNICAL FIELD

The present invention relates to a semiconductor device, and for example, to a semiconductor device including two non-volatile memory cells holding complementary data.

BACKGROUND ART

A technique for enhancing confidentiality of stored data has conventionally been known.

For example, Japanese Patent Laying-Open No. 2008-204507 (PTD 1) describes a scheme for a semiconductor device, for write in a data storage unit after scramble processing is performed onto write data by using scramble information generated by a random number generation unit. Since scramble information is stored in an SRAM representing a volatile memory, scramble information is erased at the time when power is turned off even though stored data remains in the data storage unit in a power off state of the semiconductor device, and hence stored data in the data storage unit can no longer correctly be read. Thus, confidentiality of stored data can be improved.

Japanese Patent Laying-Open No. 2010-277584 (PTD 2) also describes a non-volatile storage device which subjects write data to scramble processing, writes the data, reads the data, and thereafter subjects the data to descramble processing.

PATENT DOCUMENT

PTD 1: Japanese Patent Laying-Open No. 2008-204507
PTD 2: Japanese Patent Laying-Open No. 2010-277584

SUMMARY OF INVENTION

Technical Problem

In twin cells constituted of two cells holding complementary data, by erasing twin cell data, threshold voltages of the two cells are both set to be low. Here, there is a possibility that a difference in threshold voltage between the two cells in a write state before erase of the twin cell data remains also after erase of the twin cell data. Therefore, even though the twin cell data has been erased, the write state before erase of the twin cell data is read, which may give rise to a problem in terms of security.

According to the scheme described in PTD 1, however, stored data in the data storage unit is not read when power is turned off The scheme described in PTD 2 aims to detect an abnormal condition such as cut-off of power supply during write by storing a write done flag which is a bit pattern different for each write unit and an error correction code together with write data subjected to scramble processing, and cannot solve the problem in terms of security as described above.

Other objects and novel features will become apparent from the description herein and the accompanying drawings.

Solution to Problem

According to a semiconductor device in one embodiment of the present invention, a scramble unit subjects data to be written into twin cells in a first storage unit to scramble processing by using scramble data. A write unit writes write data subjected to the scramble processing into the twin cells in the first storage unit. A write unit writes the scramble data into a memory cell in a second storage unit. A descramble unit subjects the data read from the first storage unit to descramble processing by using the scramble data read from the second storage unit.

Advantageous Effects of Invention

According to one embodiment of the present invention, reading of a write state before erase of twin cell data can be avoided.

BRIEF DESCRIPTION OF DRAWINGS

FIG. 5 is (a) a diagram showing an example of a bias voltage applied to a split gate flash memory element, (b) a diagram showing an example of a bias voltage applied to a stacked gate flash memory element under a hot carrier write scheme, and (c) a diagram showing an example of a bias voltage applied to a stacked gate flash memory element under an FN tunnel write scheme.

DESCRIPTION OF EMBODIMENTS

Embodiments of the present invention will be described below with reference to the drawings.

First Embodiment

Figure 1:
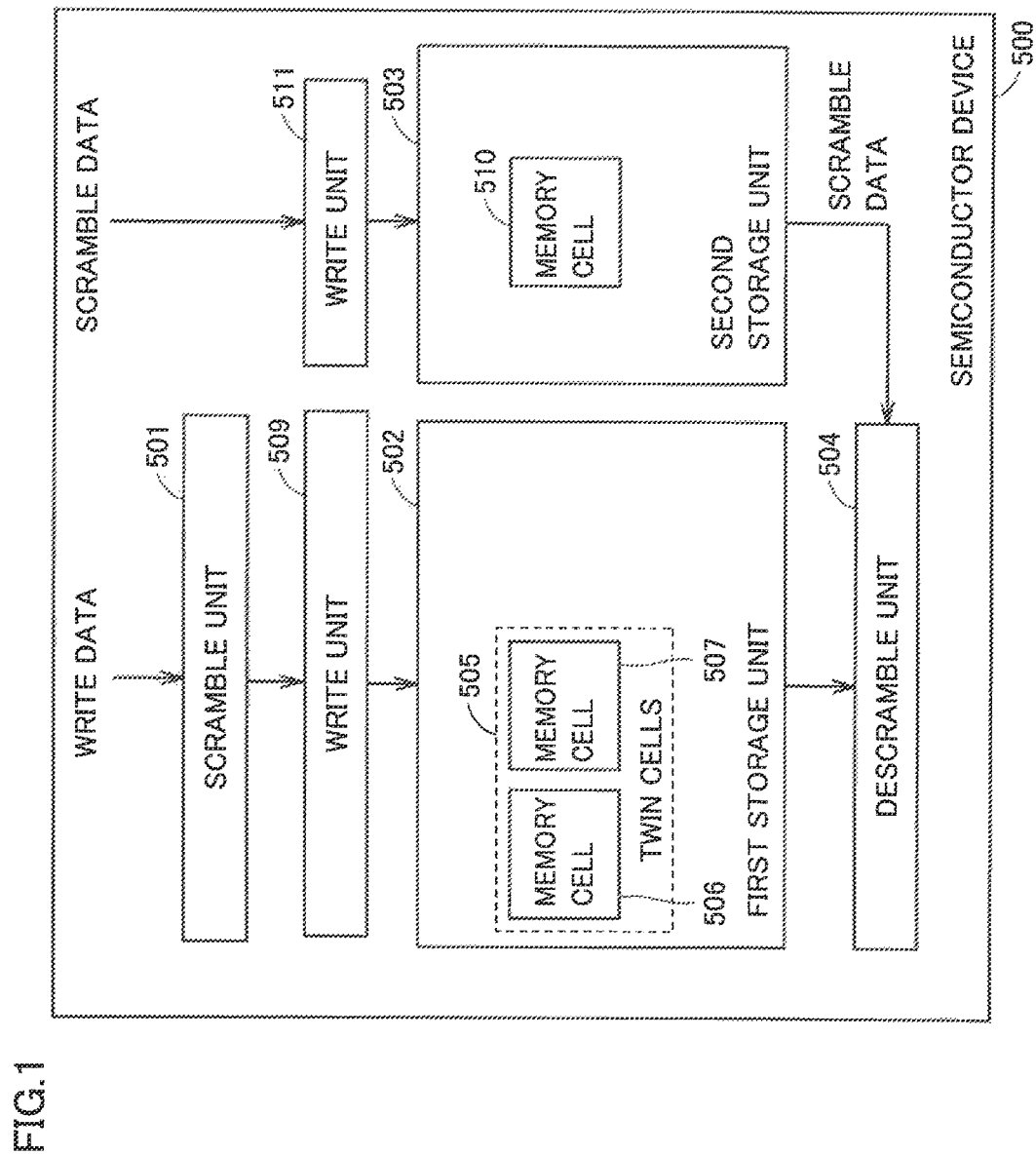
FIG. 1 is a diagram showing a configuration of a semiconductor device in a first embodiment.

FIG. 1 is a diagram showing a configuration of a semiconductor device in a first embodiment.

This semiconductor device 500 includes a first storage unit 502, a second storage unit 503, a scramble unit 501, a write unit 509, a write unit 511, and a descramble unit 504.

First storage unit 502 includes twin cells 505. Twin cells 505 are constituted of a memory cell 506 and a memory cell 507. Memory cell 506 and memory cell 507 are electrically rewritable. Twin cells 505 complementarily store 1-bit data based on a difference in threshold voltage between memory cell 506 and memory cell 507.

Second storage unit 503 includes a memory cell 510 which is electrically rewritable.

When data in twin cells 505 in first storage unit 502 is erased, data in memory cell 510 in second storage unit 503 is also erased.

Scramble unit 501 subjects data to be written into twin cells 505 in first storage unit 502 to scramble processing with the use of scramble data.

Write unit 509 writes write data subjected to scramble processing into twin cells 505 in first storage unit 502.

Write unit 511 writes the scramble data into memory cell 510 in second storage unit 503.

Descramble unit 504 subjects the data read from first storage unit 502 to descramble processing with the use of the scramble data read from second storage unit 503.

Figure 2:
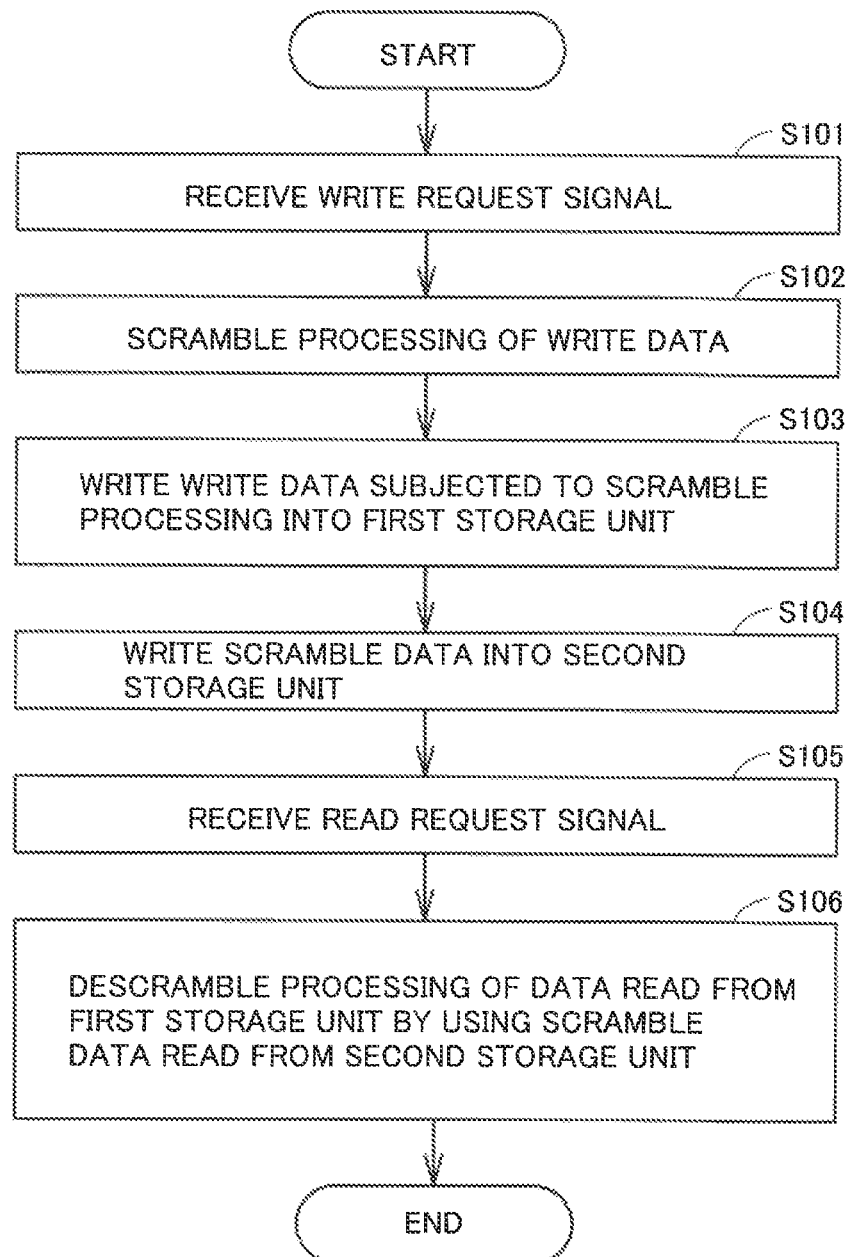
FIG. 2 is a flowchart showing a procedure in processing for erasing twin cell data from a memory array in the semiconductor device in the first embodiment.

FIG. 2 is a flowchart showing a procedure in processing for writing write data into and reading write data from the first storage unit in the semiconductor device in the first embodiment.

Initially, the semiconductor device receives a write request signal (step S101).

Scramble unit 501 subjects data to be written into twin cells 505 in first storage unit 502 to scramble processing with the use of scramble data (step S102).

Then, write unit 509 writes write data subjected to the scramble processing into twin cells 505 in first storage unit 502 (step S103).

Then, write unit 511 writes scramble data into memory cell 510 in second storage unit 503 (step S104).

Then, the semiconductor device receives a read request signal (step S105).

Then, descramble unit 504 subjects the data read from first storage unit 502 to descramble processing with the use of the scramble data read from second storage unit 503 (step S106).

As set forth above, according to the present embodiment, even if write data subjected to scramble processing is erased, write data cannot be restored unless both of the write data subjected to the scramble processing and the scramble data are read.

Second Embodiment

A semiconductor device in the present embodiment is implemented by a microcomputer.

Microcomputer

Figure 3:
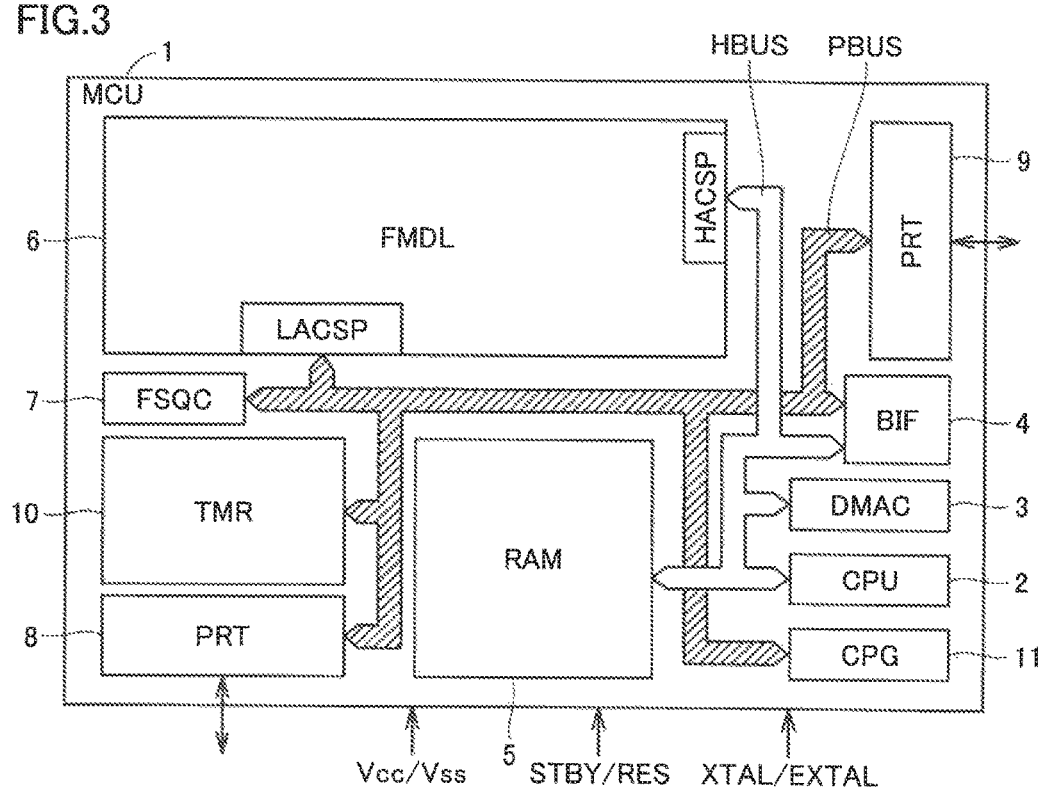
FIG. 3 is a diagram showing a configuration of a microcomputer in a third embodiment.

FIG. 3 is a diagram showing a configuration of a microcomputer 1 in a second embodiment.

Microcomputer (MCU) 1 shown in FIG. 3 is formed on one semiconductor chip as made of single crystal silicon, for example, with a technique for manufacturing a complementary MOS integrated circuit.

Though microcomputer 1 is not particularly restricted, it has a high-speed bus HBUS and a peripheral bus PBUS. Though high-speed bus HBUS and peripheral bus PBUS are not particularly restricted, each has a data bus, an address bus, and a control bus. By providing two buses, load imposed on the bus can be mitigated and a high-speed access operation can be ensured as compared with a case that all circuits are commonly connected to a common bus.

A central processing unit (CPU) 2 which includes an instruction control unit and an execution unit and executes instructions, a direct memory access controller (DMAC) 3, and a bus interface circuit (BIF) 4 carrying out bus interface control or bus bridge control between high-speed bus HBUS and peripheral bus PBUS are connected to high-speed bus HBUS.

Furthermore, a random access memory (RAM) 5 made use of as a work area of central processing unit 2 and a flash memory module (FMDL) 6 as a non-volatile memory module storing data or a program are connected to high-speed bus HBUS.

A flash sequencer (FSQC) 7 carrying out command access control on flash memory module (FMDL) 6, external input/output ports (PRT) 8 and 9, a timer (TMR) 10, and a clock pulse generator (CPG) 11 generating an internal clock CLK for controlling microcomputer 1 are connected to peripheral bus PBUS.

Microcomputer 1 includes a clock terminal having an oscillator connected to XTAL/EXTAL or supplied with an external clock, an external hardware stand-by terminal STB indicating a stand-by state, an external reset terminal RES indicating reset, an external power supply terminal Vcc, and an external ground terminal Vss.

Here, since flash sequencer 7 as a logic circuit and flash memory module 6 in an array configuration are designed with a separate CAD tool, they are illustrated as different circuit blocks for the sake of convenience, however, they together implement one flash memory. Flash memory module 6 is connected to high-speed bus HBUS through a read-only high-speed access port (HACSP). CPU 2 or DMAC 3 can read-access flash memory module 6 from high-speed bus HBUS through the high-speed access port. CPU 2 or DMAC 3 issues a command to flash sequencer 7 via peripheral bus PBUS through bus interface 4 when access for write and initialization is made to flash memory module 6. Thus, flash sequencer 7 controls an operation for initialization of or write into a flash memory module from peripheral bus PBUS through a low-speed access port (LACSP).

Flash Memory Module

Figure 4:
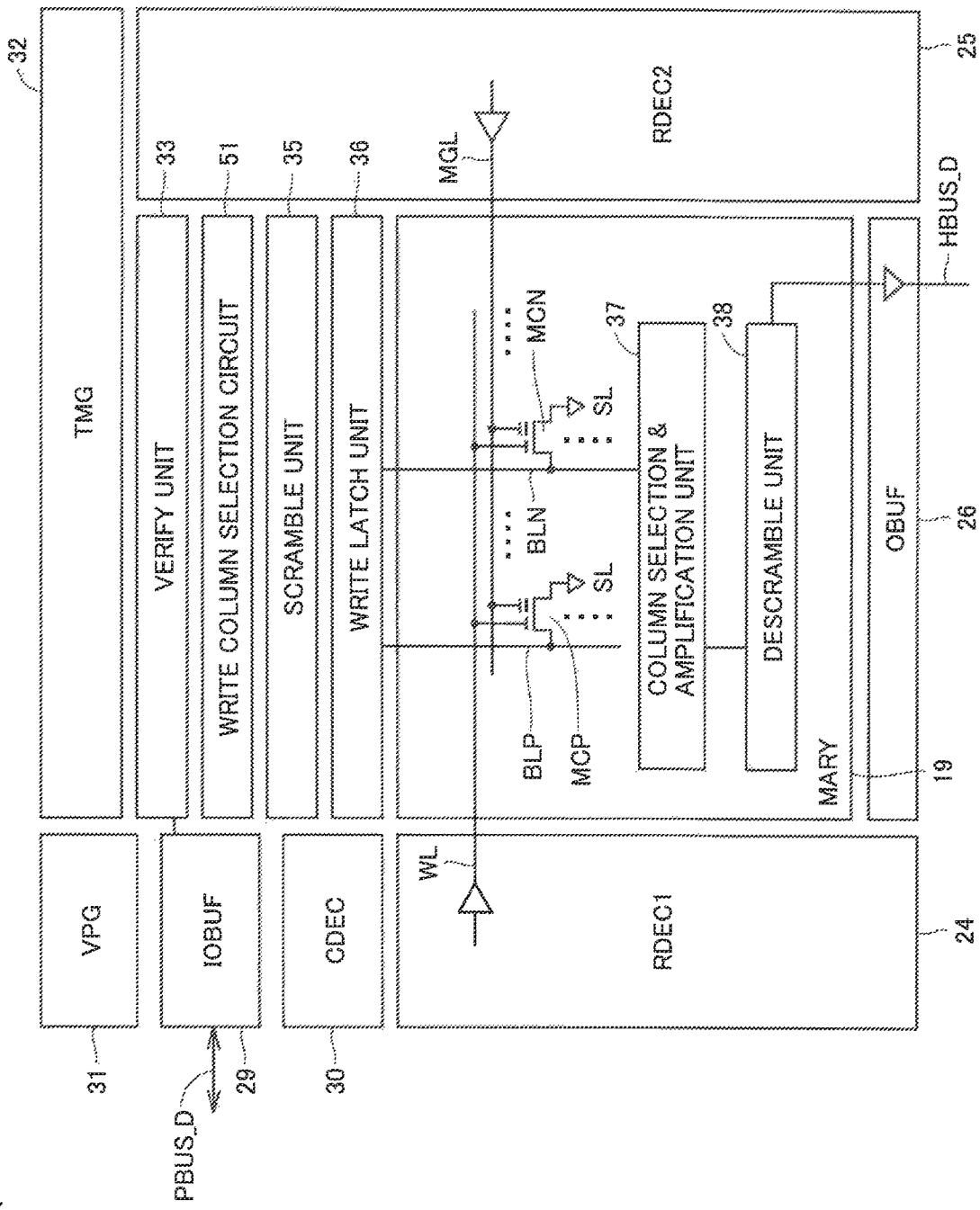
FIG. 4 is a diagram showing a configuration of a flash memory module.

FIG. 4 is a diagram showing a configuration of flash memory module 6.

Flash memory module 6 stores 1-bit information with the use of two non-volatile memory cells. Namely, a memory array (MARY) 19 includes a plurality of sets of two non-volatile memory cells MCP and MCN defined as one-bit twin cells, each of which is rewritable. FIG. 4 representatively shows only one pair. Herein, memory cell MCP is called a positive cell and memory cell MCN is called a negative cell.

Volatile memory cells MCP and MCN are implemented, for example, by a split gate flash memory element exemplified in FIG. 5 (a). This memory element has a control gate CG and a memory gate MG arranged on a channel formation region between source and drain regions with a gate insulating film being interposed. An electron trap region (SiN) made of silicon nitride or the like is arranged between memory gate MG and the gate insulating film. The source or drain region on a side of a selection gate is connected to a bit line BL and the source or drain region on a side of memory gate MG is connected to a source line SL.

In order to lower a threshold voltage Vth of the memory cell, BL=Hi–Z (a high impedance state), CG=Open, MG=–10 V, SL=6, and WELL=0V are set, and electrons are pulled from the electron trap region (SiN) to a well region (WELL) owing to high electric field between the well region (WELL) and memory gate MG. A plurality of memory cells which share memory gate MG are defined as this process unit.

In order to raise threshold voltage Vth of the memory cell, BL=0 V, CG=0.9 V, MG=10 V, SL=6, and WELL=0 V are set and a write current is fed from source line SL to bit line BL, so that hot electrons generated in a boundary unit between control gate CG and memory gate MG are injected into the electron trap region (SiN). Since injection of electrons is determined based on whether or not to feed a bit line current, this processing is controlled in a unit of a bit.

Reading is carried out with BL=1.5 V, CG=1.5 V, MG=0 V, SL=0 V, and WELL=0 V being set. When threshold voltage Vth of the memory cell is low, the memory cell is set to on, and when threshold voltage Vth is high, the memory cell is set to off.

The memory cell is not limited to the split gate flash memory element, and may be a stacked gate flash memory element exemplified in FIG. 5 (b) and FIG. 5 (c). This memory element is configured as a floating gate FG and a control gate WL are stacked on the channel formation region between source and drain regions with a gate insulating film being interposed. In FIG. 5 (b), threshold voltage Vth is raised under a hot carrier write scheme and threshold voltage Vth is lowered by releasing electrons into well region WELL. In FIG. 5 (c), threshold voltage Vth is raised under an FN tunnel write scheme and threshold voltage Vth is lowered by releasing electrons into bit line BL.

A voltage applied to memory gate MG, control gate CG, source line SL, WELL, and bit line BL described above is generated in a power supply circuit (VPG) 31 and supplied under the control by flash sequencer 7.

In the description below, description will be given assuming that a memory element is implemented by a split gate flash memory element.

Information storage in one set of twin cells constituted of non-volatile memory cells MCP and MCN is achieved by storing complementary data in non-volatile memory cells MCP and MCN.

Namely, each of memory cells MCP and MCN can hold cell data "1" (a low threshold voltage state; a threshold voltage being lower than an erase verify level) or cell data "0" (a high threshold voltage state; a threshold voltage being equal to or higher than the erase verify level).

Figure 6:
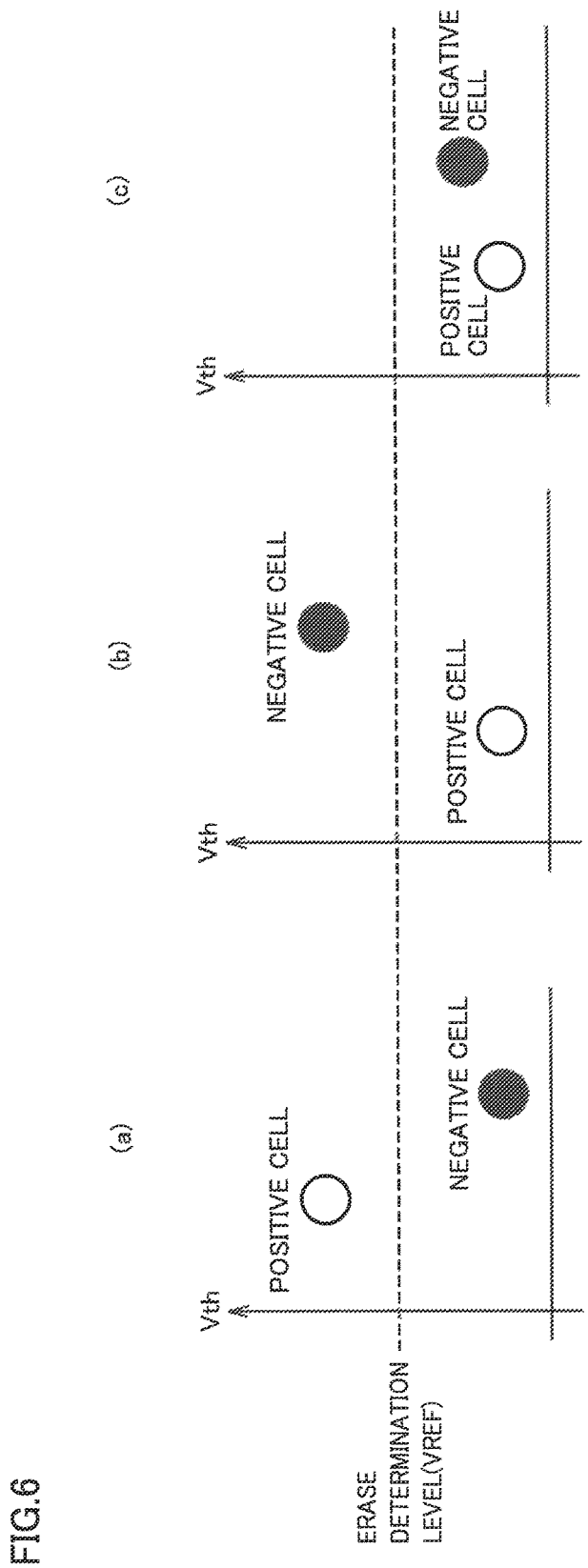
FIG. 6 is (a) a diagram showing a state that twin cell data stores "0", (b) a diagram showing a state that twin cell data stores "1", and (c) a diagram showing an initialized state of the twin cell data.

As shown in FIG. 6 (a), twin cell data "0" refers to a state that positive cell MCP holds cell data "0" and negative cell MCN holds cell data "1". As shown in FIG. 6 (b), twin cell data "1" refers to a state that positive cell MCP holds cell data "1" and negative cell MCN holds cell data "0". As shown in FIG. 6 (c), a state that both of positive cell MCP and negative cell MCN of the twin cells hold cell data "1" refers to an initialized state and the twin cell data is unsteady. The initialized state is also called a blank erase state.

Setting from a state of twin cell data "0" and a state of twin cell data "1" to the initialized state is referred to as erase of twin cell data. Setting from the initialized state to a state that twin cell data "1" is held or a state that twin cell data "0" is held is referred to as normal write.

In erasing twin cell data, after processing for setting cell data in both of positive cell MCP and negative cell MCN to "0" (called pre-write) is once performed, processing for setting cell data in both cells to "1" by applying erase pulses is performed. In pre-write, write weaker than in normal write is carried out by lowering a voltage to be applied to both of positive cell MCP and negative cell MCN as compared with a voltage in normal write or shortening a period of application of write pulses. In pre-write, an amount of increase in threshold voltage of a memory cell lower in threshold voltage is smaller than an amount of increase in threshold voltage Vth during normal write. The purpose of pre-write is to lessen variation in erase stress between positive cell MCP and negative cell MCN so as to suppress deterioration in retention characteristics. During pre-write, a voltage lower than a voltage during general normal write (increase in Vth) shown in FIG. 5 is applied such that stress applied during pre-write is not higher than stress applied during normal write.

Figure 7:
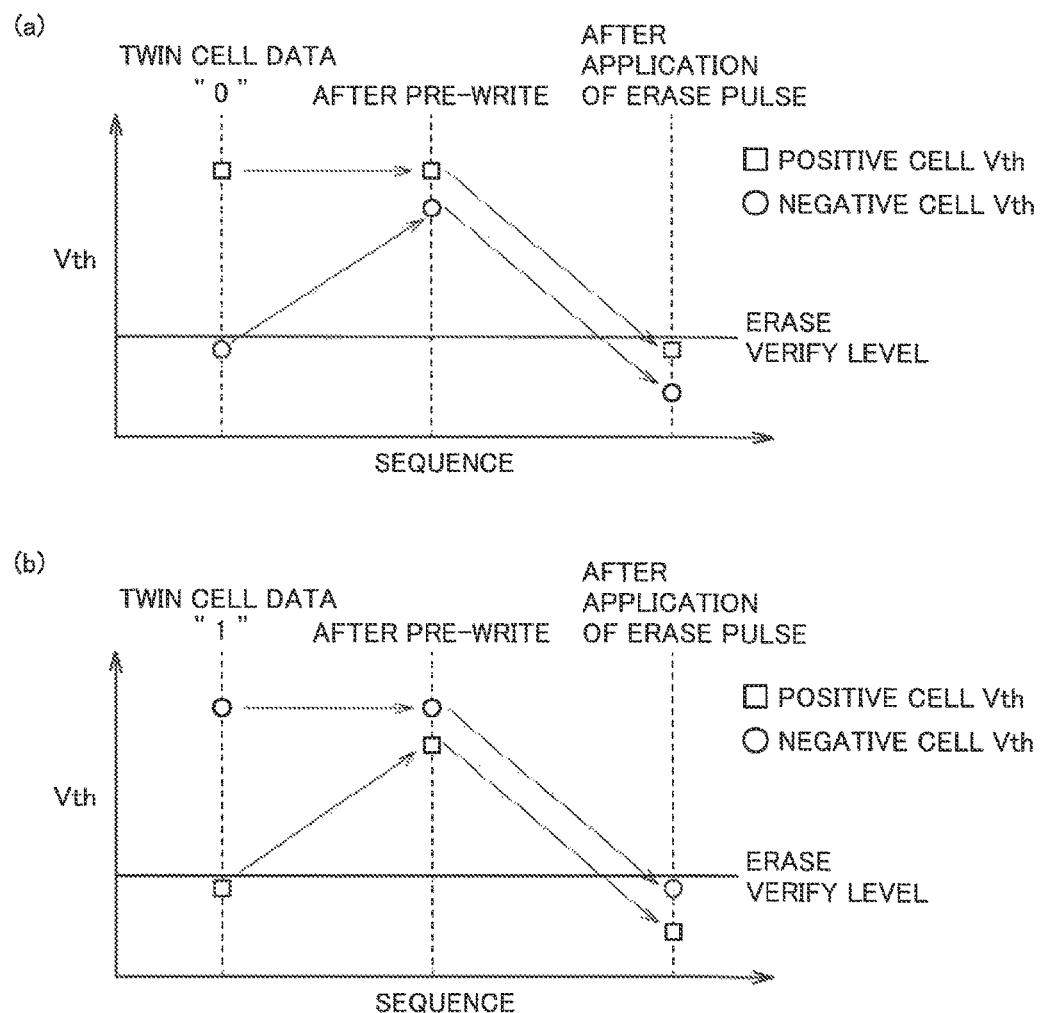
FIG. 7 is (a) a diagram showing a sequence in erasing twin cell data "0" and (b) a diagram showing a sequence in erasing twin cell data "1".

FIG. 7 (a) is a diagram showing a sequence in erasing twin cell data "0".

As shown in FIG. 7 (a), in executing erase of twin cell data "0", as a result of pre-write, both of the cells are set to the initialized state in which cell data "1" is held. Before erase, however, threshold voltage Vth of positive cell MCP is higher than threshold voltage Vth of negative cell MCN, and hence this relation may be maintained even after erase. When reading is carried out with this relation being maintained, data "0" equal to substantially immediately preceding twin cell data "0" may be read instead of an unsteady value because of a difference in threshold voltage Vth between positive cell MCP and negative cell MCN in spite of the initialized state being set.

FIG. 7 (b) is a diagram showing a sequence in erasing twin cell data "1".

As shown in FIG. 7 (b), in erasing twin cell data "1", as a result of pre-write, both cells are set to the initialized state in which cell data "1" is held. Before erase, however, threshold voltage Vth of negative cell MCN is higher than threshold voltage Vth of positive cell MCP, and hence this relation may be maintained even after erase. When reading is carried out in this immediately preceding state of the twin cell data, data "1" equal to substantially immediately preceding twin cell data "1" may be read instead of an unsteady value because of a difference in threshold voltage Vth between positive cell MCP and negative cell MCN in spite of the initialized state being set.

If data equal to immediately preceding twin cell data is read at a high probability instead of such an unsteady value that data is not determined each time of reading in spite of such erase, a problem in terms of security can arise. The present embodiment aims to solve such a possible problem.

In memory cells MCP and MCN of the twin cells representatively shown in FIG. 4, memory gate MG is connected to a common memory gate selection line MGL and control gate CG is connected to common word line WL. Actually, a large number of twin cells are arranged in matrix and connected to respective corresponding memory gate selection lines MGL and word lines WL in a unit aligned in a row direction. Memory cells MCP and MCN are connected to bit lines BLP and BLN in a unit of a column.

Word line WL is selected by a first row decoder (RDEC1) 24. Memory gate selection line MGL is selected by a second row decoder (RDEC2) 25. A selection operation by first row decoder 24 and second row decoder 25 follows address information supplied to HACSP in read access and follows address information supplied to LACSP in a data write operation and an initialization operation.

A write column selection circuit 51 selects a write column in accordance with a result of decoding by a column decoder (CDEC) 30 and outputs write data sent from an input/output circuit (IOBUF) 29 interfaced with the data bus (PBUS_D) of peripheral bus PBUS to a scramble unit 35. A selection operation by column decoder 30 follows address information supplied to LACSP.

Scramble unit 35 subjects the write data sent from write column selection circuit 51 to scramble processing and sends the write data subjected to the scramble processing to a write latch unit 36.

Write latch unit 36 latches write data subjected to the scramble processing and writes the write data into any of memory cells MCP and MCN in the selected write column (that is, raises threshold voltage Vth) by allowing a write current to flow to any of bit lines BLP and BLN in the selected write column.

A verify unit 33 verifies whether or not threshold voltage Vth of memory cells MCP and MCN is higher than a write verify level in accordance with a voltage of bit lines BLP and BLN in the selected write column and with write data subjected to the scramble processing which is held in write latch unit 36. A result of write verify is supplied to flash sequencer 7 through peripheral data bus PBUS_D.

Verify unit 33 executes erase verify. In erase verify, whether or not threshold voltage Vth of both of memory cells MCP and MCN constituting each set of twin cells in an erase target region is lower than an erase verify level is verified. A result of erase verify is supplied to flash sequencer 7 through peripheral data bus PBUS_D.

Bit line BLP connected to memory cell MCP and bit line BLN connected to memory cell MCN are connected to a column selection & amplification unit 37.

Column selection & amplification unit 37 selects a read column. Column selection & amplification unit 37 reads twin cell data in memory cells MCP and MCN in a selected read column by amplifying a difference in voltage between bit lines BLP and BLN in the selected read column.

A descramble unit 38 subjects read twin cell data output from column selection & amplification unit 37 to descramble processing and outputs the twin cell data to data bus HBUS_D of high-speed bus HBUS through an output buffer (OBUF) 26.

Power supply circuit (VPG) 31 generates various operation voltages necessary for reading, writing, and initialization. A timing generator (TMG) 32 generates an internal control signal defining internal operation timing in accordance with an access strobe signal supplied from CPU 2 to HACSP and an access command supplied from FSQC 7 to LACSP.

A control unit of a flash memory is implemented by flash sequencer (FSQC) 7 and timing generator (TMG) 32.

Figure 8:
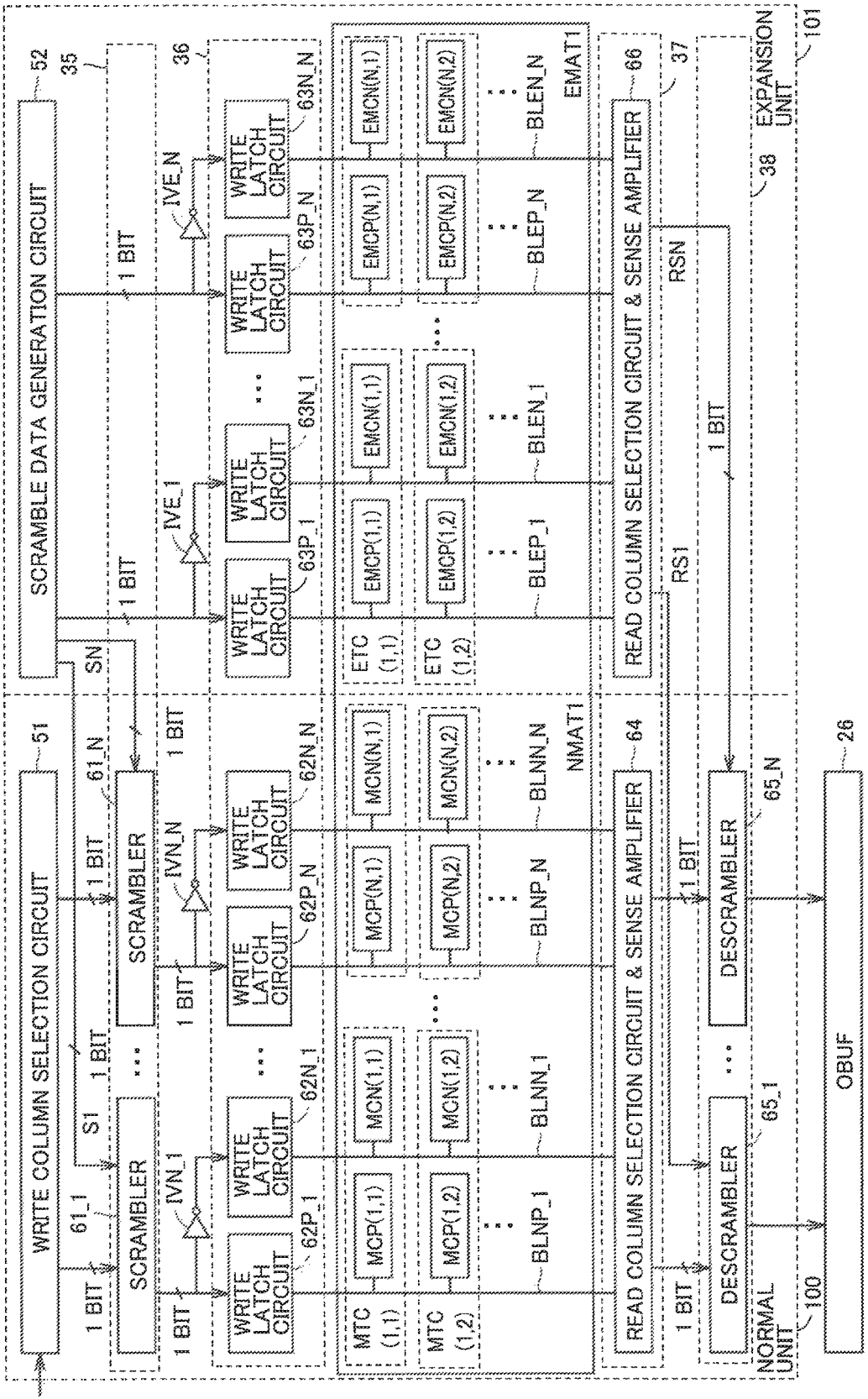
FIG. 8 is a diagram showing a detailed circuit configuration of a system for reading, writing, and erasing twin cell data in a second embodiment.

FIG. 8 is a diagram showing main components involved with write and read of twin cell data in the semiconductor device in the second embodiment.

As shown in FIG. 8, the semiconductor device in the second embodiment includes a normal unit 100 and an expansion unit 101.

Normal unit 100 includes write column selection circuit 51, scramblers 61_1 to 61_N, inverters IVN_1 to IVN_N, write latch circuits 62P_1 to 62P_N and 62N_1 to 62N_N, a normal mat NMAT1, a read column selection circuit & sense amplifier 64, and descramblers 65_1 to 65_N.

Expansion unit 101 includes a scramble data generation circuit 52, inverters IVE_1 to IVE_N, write latch circuits 63P_1 to 63P_N and 63N_1 to 63N_N, an expansion mat EMAT1, and a read column selection circuit & sense amplifier 66.

Scramblers 61_1 to 61_N implement scramble unit 35 in FIG. 4. Descramblers 65_1 to 65_N implement descramble unit 38 in FIG. 4. Write latch circuits 62P_1 to 62P_N, 62N_1 to 62N_N, 63P_1 to 63P_N, and 63N_1 to 63N_N implement write latch unit 36 in FIG. 4. Read column selection circuits & sense amplifiers 64 and 66 implement column selection & amplification unit 37 in FIG. 4.

Scramble data generation circuit 52 generates N-bit scramble data S1 to SN. Each bit Si is sent to a write latch circuit 63P_i and sent to a write latch circuit 63N_i via an inverter IVE_i.

Scramble data generation circuit 52 outputs the same scramble data (S1 to SN) for write data the same in row selected by first row decoder (RDEC1) 24 and second row decoder (RDEC2) 25 and outputs scramble data (S1 to SN) different from one another for write data different in selected row.

Scramble data generation circuit 52 outputs scramble data (S1 to SN) to write latch circuits 63P_1 to 63P_N and 63N_1 to 63N_N when generated scramble data (S1 to SN) has not yet been written in EMAT1.

Normal mat NMAT1 includes a plurality of twin cells MTC (i, j). Here, i represents a column and is set to 1 to N and j represents a row and is set to 1 to L. Twin cells MTC (i, j) include a positive cell MCP (i, j) and a negative cell MCN (i, j). Positive cell MCP (i, j) is connected to a bit line BLNP_i. Negative cell MCN (i, j) is connected to a bit line BLNN_i.

Expansion mat EMAT1 includes a plurality of twin cells ETC (i, j). Here, i represents a column and is set to 1 to N and j represents a row and is set to 1 to L. Twin cells ETC (i, j) include a positive cell EMCP (i, j) and a negative cell EMCN (i, j). Positive cell EMCP (i, j) is connected to a bit line BLEP_i. Negative cell EMCN (i, j) is connected to a bit line BLEN_i.

When twin cell data in twin cells MTC (i, j) (i=1 to N, j=1 to L) in normal mat NMAT1 is erased, twin cell data in twin cells ETC (i, j) (i=1 to N, j=1 to L) in expansion mat EMAT1 is also erased.

Write column selection circuit 51 selects a column in which data is to be written among a first column to an Nth column in normal mat NMAT1. When the selected column is a column j, write column selection circuit 51 outputs 1-bit write data sent from input/output circuit (IOBUF) 29 to a scrambler 61_j corresponding to selected column j.

Scrambler 61_i (i=1 to N) receives 1 bit Si of N-bit scramble data S1 to SN from scramble data generation circuit 52. When 1-bit write data D is sent from write column selection circuit 51, scrambler 61_i subjects 1-bit write data to scramble processing with Si. Write data DSi subjected to scramble processing is sent to write latch circuit 62P_i and sent to write latch circuit 62N_i via inverter IVN_i.

Scramble processing means reversible conversion of write data with the use of scramble data. Descramble processing means obtaining original write data by converting the data subjected to scramble processing with the use of scramble data.

In one example of a scramble processing scheme, original write data is obtained by calculating an exclusive logical sum of write data and scramble data through scramble processing and calculating an exclusive logical sum of data subjected to the scramble processing and scramble data through descramble processing. Here, scramble processing schemes of N scramblers 61_i (i=1 to N) may all be the same or different from one another, or some schemes may be the same and some schemes may be different.

When write data DSi subjected to scramble processing which is sent from scrambler 61_i is "0", write latch circuit 62P_i (i=1 to N) allows a write current to flow to bit line BLNP_i by allowing bit line BLNP_i to be connected to a ground voltage Vss during a period in which write pulses WPLS are activated. Thus, threshold voltage Vth of memory cell MCP (i, k) in a selected row k increases and cell data "0" is written.

When write data DSi subjected to scramble processing which is sent from scrambler 61_i is "1", write latch circuit 62P_i (i=1 to N) does not allow a write current to flow to bit line BLNP_i by allowing bit line BLNP_i to be connected to a power supply voltage VDD. Thus, threshold voltage Vth of memory cell MCP (i, k) in selected row k does not vary.

When inverted data /DSi of write data subjected to scramble processing which is sent from inverter IVN_i is "0", write latch circuit 62N_i (i=1 to N) allows a write current to flow to bit line BLNN_i by allowing bit line BLNN_i to be connected to ground voltage Vss during a period in which write pulses WPLS are activated. Thus, threshold voltage Vth of memory cell MCN (i, k) in selected row k increases and cell data "0" is written.

When inverted data /DSi of write data subjected to scramble processing which is sent from inverter IVN_i is "1", write latch circuit 62N_i (i=1 to N) does not allow a write current to flow to bit line BLNN_i by allowing bit line BLNN_i to be connected to power supply voltage VDD. Thus, threshold voltage Vth of memory cell MCN (i, k) in selected row k does not vary.

Read column selection circuit & sense amplifier 64 selects a column from which data is to be read, among the first column to the Nth column in normal mat NMAT1. When a selected column is a column j, read column selection circuit & sense amplifier 64 amplifies a difference in voltage between bit line BLNP_j and bit line BLNN_j, reads twin cell data subjected to scramble processing, and outputs the twin cell data to descrambler 65_j. When a row selected by first row decoder (RDEC1) 24 and second row decoder (RDEC2) 25 is a row k, write data RDSj subjected to scramble processing in twin cells MTC (j, k) is read. When data in twin cells MTC (j, k) is not erased after write data DSj subjected to scramble processing is written in twin cells MTC (j, k), read data RDSj is equal to DSj. When data is read from twin cells MTC (j, k) after data in twin cells MTC (j, k) is read, read data RDSj should essentially have an unsteady value, however, it may be equal to DSj as described with reference to FIG. 7.

Write latch circuit 63P_i (i=1 to N) receives 1 bit Si of N-bit scramble data S1 to SN from scramble data generation circuit 52. When Si is "0", write latch circuit 63P_i allows a write current to flow to bit line BLEP_i by allowing bit line BLEP_i to be connected to ground voltage Vss during a period in which write pulses WPLS are activated. Thus, threshold voltage Vth of memory cell EMCP (i, k) in selected row k increases and cell data "0" is written.

When Si is "1", write latch circuit 63P_i (i=1 to N) does not allow a write current to flow to bit line BLEP_i by allowing bit line BLEP_i to be connected to power supply voltage VDD. Thus, threshold voltage Vth of memory cell EMCP (i, k) in selected row k does not vary.

Write latch circuit 63N_i (i=1 to N) receives an inverted value /Si of 1 bit Si of N-bit scramble data S1 to SN sent from inverter IVE_i. When /Si is "0", write latch circuit 63N_i allows a write current to flow to bit line BLEN_i by allowing bit line BLEN_i to be connected to ground voltage Vss during a period in which write pulses WPLS are activated. Thus, threshold voltage Vth of memory cell EMCN (i, k) in selected row k increases and cell data "0" is written.

When /Si is "1", write latch circuit 63N_i (i=1 to N) does not allow a write current to flow to bit line BLEN_i by allowing bit line BLNN_i to be connected to power supply voltage VDD. Thus, threshold voltage Vth of memory cell EMCN (i, k) in selected row k does not vary.

Read column selection circuit & sense amplifier 66 selects a column from which data is to be read, among a first column to an Nth column in expansion mat EMAT1. When a selected column is a column j, read column selection circuit & sense amplifier 66 amplifies a difference in voltage between bit line BLEP_j and bit line BLEN_j, reads scramble data, and outputs the read scramble data to descrambler 65_j. When a row selected by first row decoder (RDEC1) 24 and second row decoder (RDEC2) 25 is a row k, scramble data RSj in twin cells ETC (j, k) is output. When data in twin cells ETC (j, k) is not erased after scramble data Sj is written in twin cells ETC (j, k), read twin cell data RSj is equal to Sj. When data is read from twin cells ETC (j, k) after data in twin cells ETC (j, k) is erased, read data RSj should essentially have an unsteady value, however, it may be equal to Sj as described with reference to FIG. 7.

Descrambler 65_i (i=1 to N) subjects 1-bit twin cell data RDSi which has been subjected to scramble processing and output from read column selection circuit & sense amplifier 64 to descramble processing with the use of 1-bit scramble data RSi output from read column selection circuit & sense amplifier 66, and outputs the twin cell data to output buffer (OBUF) 26.

Here, descramble processing schemes of N descramblers 65_i (i=1 to N) may all be the same or different from one another, or some schemes may be the same and some schemes may be different. The scheme of descramble processing by descrambler 65_i (i=1 to N) should allow restoration of write data DSi converted by using scramble data Si in corresponding scrambler 61_i to original write data D by using the same scramble data Si.

As set forth above, according to the present embodiment, when write data subjected to scramble processing is written in a normal mat and is not erased, the write data subjected to scramble processing and scramble data are correctly read, so that write data can normally be restored through descramble processing.

When write data subjected to scramble processing is written into a normal mat and erased, scramble data is also erased from an expansion mat. Even in this state, both of the write data subjected to scramble processing before erase and the scramble data before erase may be read, however, a probability thereof is low. Therefore, a probability of restoration of write data through descramble processing can be low.

Modification of Second Embodiment

In the second embodiment, though 1-bit write data subjected to scramble processing is written in twin cells in a column selected by write column selection circuit 51 and a row selected by first row decoder (RDEC1) 24 and second row decoder (RDEC2) 25, limitation thereto is not intended. N-bit write data may externally be input and 1-bit write data subjected to scramble processing may be written into each of all columns in a row selected by first row decoder (RDEC1) 24 and second row decoder (RDEC2) 25.

In the second embodiment, though scrambler 61_i and descrambler 65_i subject write data to scramble processing and descramble processing with the use of 1-bit data Si, limitation thereto is not intended. Scrambler 61_i and descrambler 65_i may subject write data to scramble processing and descramble processing with the use of a plurality of bits of N-bit scramble data (S1 to SN).

Third Embodiment

Figure 9:
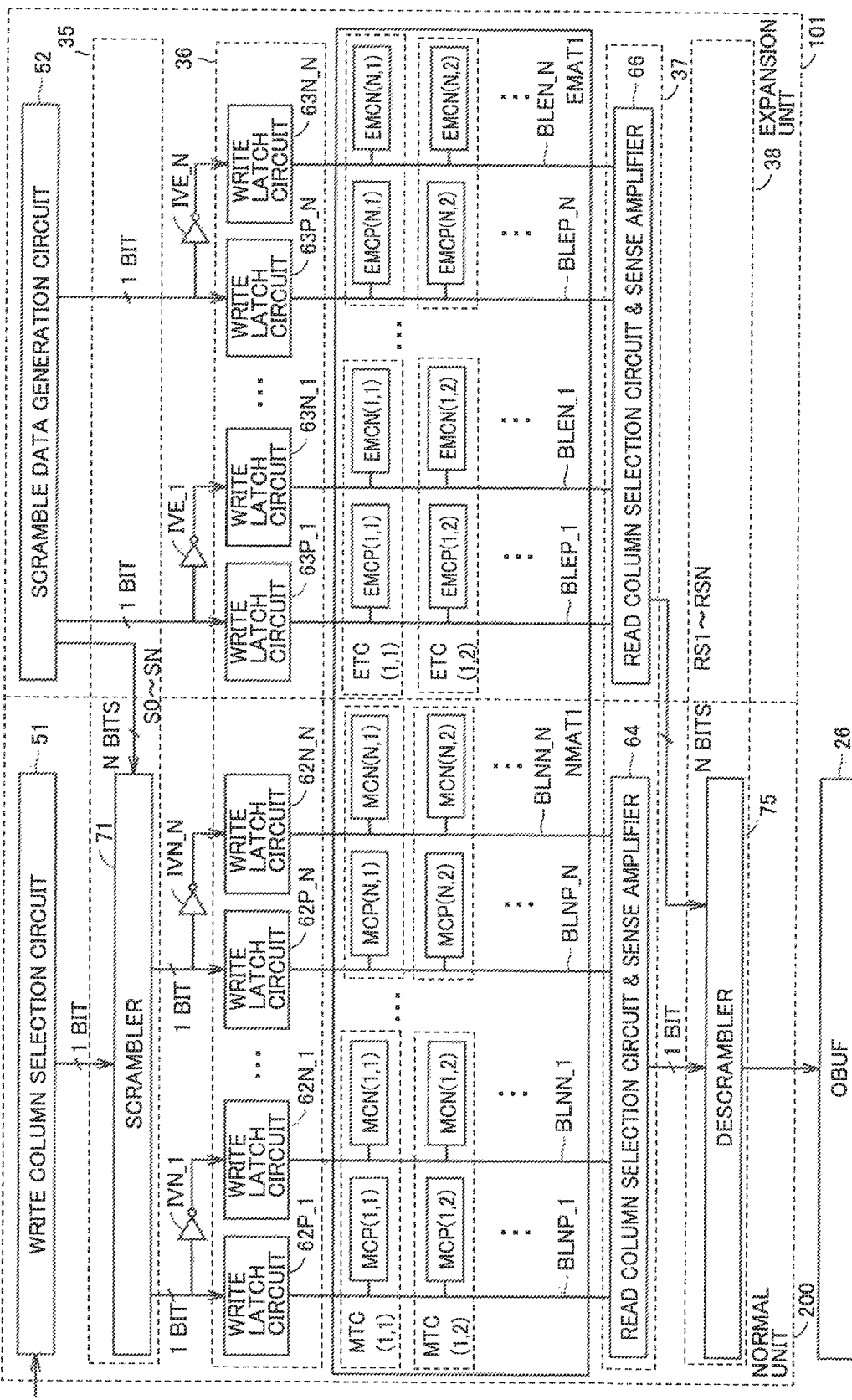
FIG. 9 is a diagram showing main components involved with write and read of twin cell data in the semiconductor device in the third embodiment.

FIG. 9 is a diagram showing main components involved with write and read of twin cell data in the semiconductor device in a third embodiment.

The semiconductor device in FIG. 9 is different from the semiconductor device in the second embodiment in FIG. 8 in the following. Normal unit 100 in the semiconductor device in FIG. 8 includes N scramblers 61_1 to 61_N and N descramblers 65_1 to 65_N, whereas a normal unit 200 in the semiconductor device in FIG. 9 includes one scrambler 71 and one descrambler 75.

Scrambler 71 receives N-bit scramble data S1 to SN from scramble data generation circuit 52. When a column selected by write column selection circuit 51 is a column i and 1-bit write data D is sent from write column selection circuit 51, scrambler 71 subjects the 1-bit write data to scramble processing with Si. Write data DSi subjected to scramble processing is sent to write latch circuit 62P_i and sent to write latch circuit 62N_i via inverter IVN_i.

Descrambler 75 subjects 1-bit twin cell data RDSi which has been subjected to scramble processing and output from read column selection circuit & sense amplifier 64 to descramble processing with the use of 1-bit scramble data RSi output from read column selection circuit & sense amplifier 66, and outputs the twin cell data to output buffer (OBUF) 26. Here, the scheme of descramble processing by descrambler 75 should allow restoration of write data DSi converted by scrambler 71 with the use of scramble data Si to original write data D with the use of the same scramble data Si.

As set forth above, according to the present embodiment, since scramble processing and descramble processing of write data in N columns are performed by one scrambler 71 and one descrambler 75, a scale of a circuit can be smaller than in the second embodiment.

Modification of Third Embodiment

In the third embodiment as well, as in the modification of the second embodiment, N-bit write data may externally be input and 1-bit write data subjected to scramble processing may be written into each of all columns in a row selected by first row decoder (RDEC1) 24 and second row decoder (RDEC2) 25.

Scrambler 71 and descrambler 75 may subject write data to scramble processing and descramble processing with the use of a plurality of bits of N-bit scramble data (S1 to SN).

Fourth Embodiment

Figure 10:
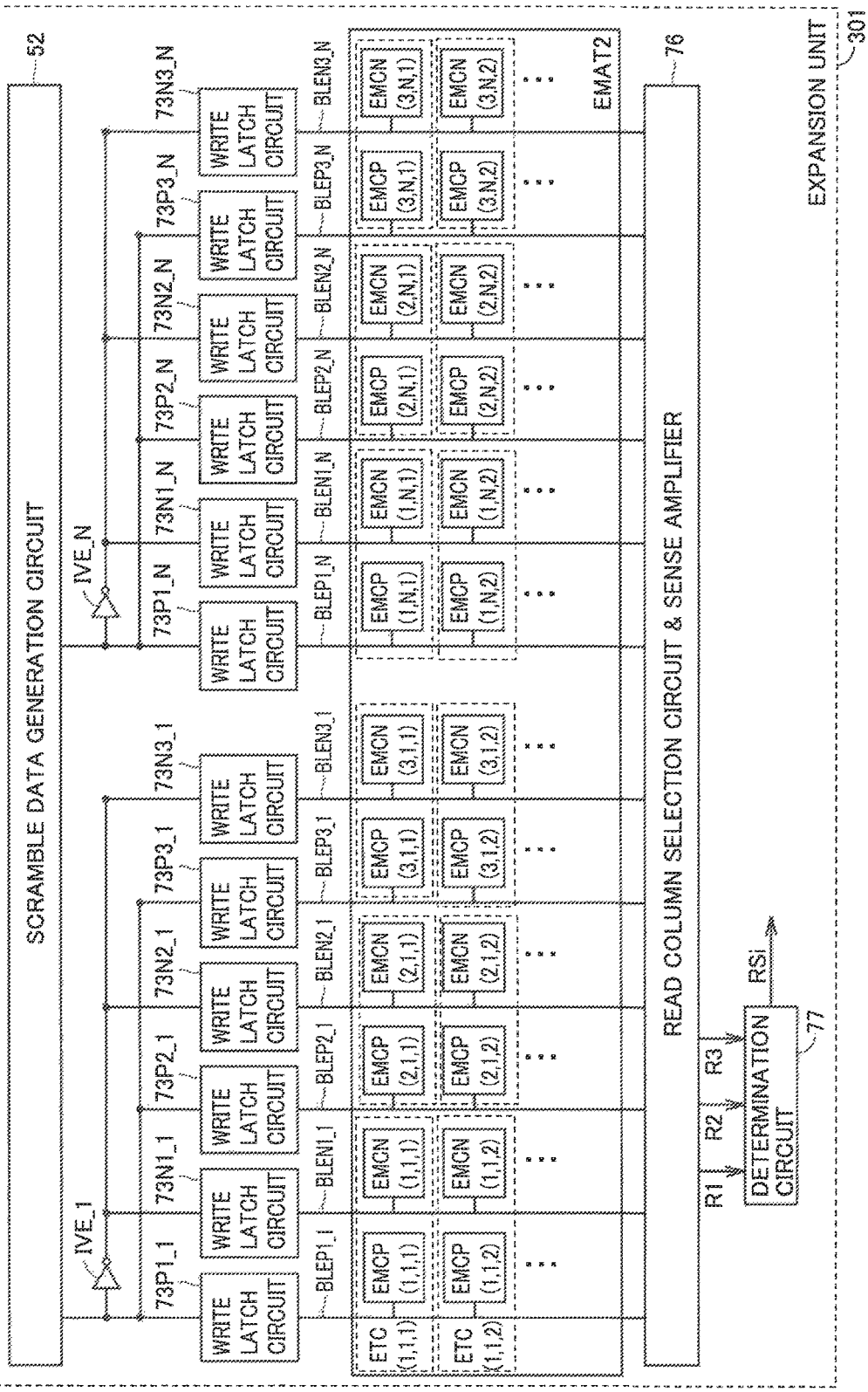
FIG. 10 is a diagram showing a configuration of an expansion unit involved with write and read of twin cell data in the semiconductor device in a fourth embodiment.

FIG. 10 is a diagram showing a configuration of an expansion unit involved with write and read of twin cell data in the semiconductor device in a fourth embodiment. Since the normal unit is the same as in the second embodiment, description will not be repeated.

An expansion unit 301 is different from expansion unit 101 in the semiconductor device in the second embodiment in FIG. 8 in the following.

Expansion unit 101 in FIG. 8 includes 2N write latch circuits 63P_1 to 63P_N and 63N_1 to 63N_N, whereas expansion unit 301 in FIG. 10 includes 6N write latch circuits 73P1_1 to 73P1_N, 73P2_1 to 73P2_N, 73P3_1 to 73P3_N, 73N1_1 to 73N1_N, 73N2_1 to 73N2_N, and 73N3_1 to 73N3_N.

Expansion mat EMAT1 in expansion unit 101 in FIG. 8 includes N×L twin cells ETC (i, j) (i is set to 1 to N and j=1 to L), whereas an expansion mat EMAT2 in expansion unit 301 in FIG. 10 includes 3N×L twin cells ETC (s, i, j) (s=1 to 3, i=1 to N, and j=1 to L).

Twin cells ETC (s, i, j) include a positive cell EMCP (s, i, j) and a negative cell EMCN (s, i, j). Positive cell EMCP (s, i, j) is connected to a bit line BLEPs_i. Negative cell EMCN (s, i, j) is connected to a bit line BLENs_i.

Scramble data generation circuit 52 generates N-bit scramble data S1 to SN. Each bit Si is sent to write latch circuits 73P1_i, 73P2_i, and 73P3_i and sent to write latch circuits 73N1_i, 73N2_i, and 73N3_i via inverter IVE_i.

Write latch circuits 73P1_i, 73P2_i, and 73P3_i receive 1 bit Si of N-bit scramble data S1 to SN from scramble data generation circuit 52. When Si is "0", write latch circuits 73P_i, 73P2_i, and 73P_i allow a write current to flow to bit lines BLEP1_i, BLEP2_i, and BLEP3_i by allowing bit lines BLEP1_i, BLEP2_i, and BLEP3_i to be connected to ground voltage Vss during a period in which write pulses WPLS are activated. Thus, threshold voltage Vth of memory cells EMCP (1, i, k), EMCP (2, i, k), and EMCP (3, i, k) in selected row k increases and cell data "0" is written.

When Si is "1", write latch circuits 73P1_i, 73P2_i, and 73P3_i do not allow a write current to flow to bit lines BLEP1_i, BLEP2_i, and BLEP3_i by allowing bit lines BLEP1_i, BLEP2_i, and BLEP3_i to be connected to power supply voltage VDD. Thus, threshold voltage Vth of memory cells EMCP (1, i, k), EMCP (2, i, k), and EMCP (3, i, k) in selected row k does not vary.

Write latch circuits 73N1_i, 73N2_i, and 73N3_i receive 1-bit inverted value /Si of N-bit scramble data S1 to SN from inverter IVE_i. When /Si is "0", write latch circuits 73N1_i, 73N2_i, and 73N3_i allow a write current to flow to bit lines BLEN1_i, BLEN2_i, and BLEN3_i by allowing bit lines BLEN1_i, BLEN2_i, and BLEN3_i to be connected to ground voltage Vss during a period in which write pulses WNLS are activated. Thus, threshold voltage Vth of memory cells EMCN (1, i, k), EMCN (2, i, k), and EMCN (3, i, k) in selected row k increases and cell data "0" is written.

When /Si is "1", write latch circuits 73N1_i, 73N2_i, and 73N3_i do not allow a write current to flow to bit lines BLEN1_i, BLEN2_i, and BLEN3_i by allowing bit lines BLEN1_i, BLEN2_i, and BLEN3_i to be connected to power supply voltage VDD. Thus, threshold voltage Vth of memory cells EMCN (1, i, k), EMCN (2, i, k), and EMCN (3, i, k) in selected row k does not vary.

Read column selection circuit & sense amplifier 76 selects a column from which data is to be read among a first column to an Nth column in expansion mat EMAT2. When the selected column is a column j, read column selection circuit & sense amplifier 66 amplifies a difference in voltage between bit line BLEP1_ j and bit line BLEN1_j, reads scramble data, and outputs the scramble data to a determination circuit 77. When the selected column is column j, read column selection circuit & sense amplifier 66 amplifies a difference in voltage between bit line BLEP2_j and bit line BLEN2_j, reads scramble data, and outputs the scramble data to determination circuit 77. When a selected column is column j, read column selection circuit & sense amplifier 66 amplifies a difference in voltage between bit line BLEP3_j and bit line BLEN3_j, reads scramble data, and outputs the scramble data to determination circuit 77.

When a row selected by first row decoder (RDEC1) 24 and second row decoder (RDEC2) 25 is a row k, first scramble data RSj1 of twin cells ETC (1, j, k), second scramble data RSj2 of twin cells ETC (2, j, k), and third scramble data RSj3 of twin cells ETC (3, j, k) are read.

When data of twin cells ETC (1, j, k), ETC (2, j, k), and ETC (3, j, k) is not erased after scramble data Sj is written into twin cells ETC (1, j, k), ETC (2, j, k), and ETC (3, j, k), read data RSj1, RSj2, and RSj3 are equal to Sj. When data is read from twin cells ETC (1, j, k), ETC (2, j, k), and ETC (3, j, k) after data of twin cells ETC (1, j, k), ETC (2, j, k), and ETC (3, j, k) is erased, read data RSj1, RSj2, and RSj3 should essentially have an unsteady value, however, they may be equal to Sj as described with reference to FIG. 7.

When first scramble data RSi1, second scramble data RSi2, and third scramble data RSi3 are all the same in value, determination circuit 77 outputs the same value as read scramble data RSi.

When two of first scramble data RSi1, second scramble data RSi2, and third scramble data RSi3 are "1" and the remainder is "0", determination circuit 77 outputs "0" as scramble data RSi. When two of first scramble data RSi1, second scramble data RSi2, and third scramble data RSi3 are "0" and the remainder is "1", determination circuit 77 outputs "1" as scramble data RSi.

As set forth above, according to the present embodiment, scramble data is written into three sets of twin cells in an expansion mat and scramble data is determined based on values for data read from the three sets of twin cells at the time of reading. Therefore, a probability of reading of scramble data before erase can be lowered.

Fifth Embodiment

Figure 11:
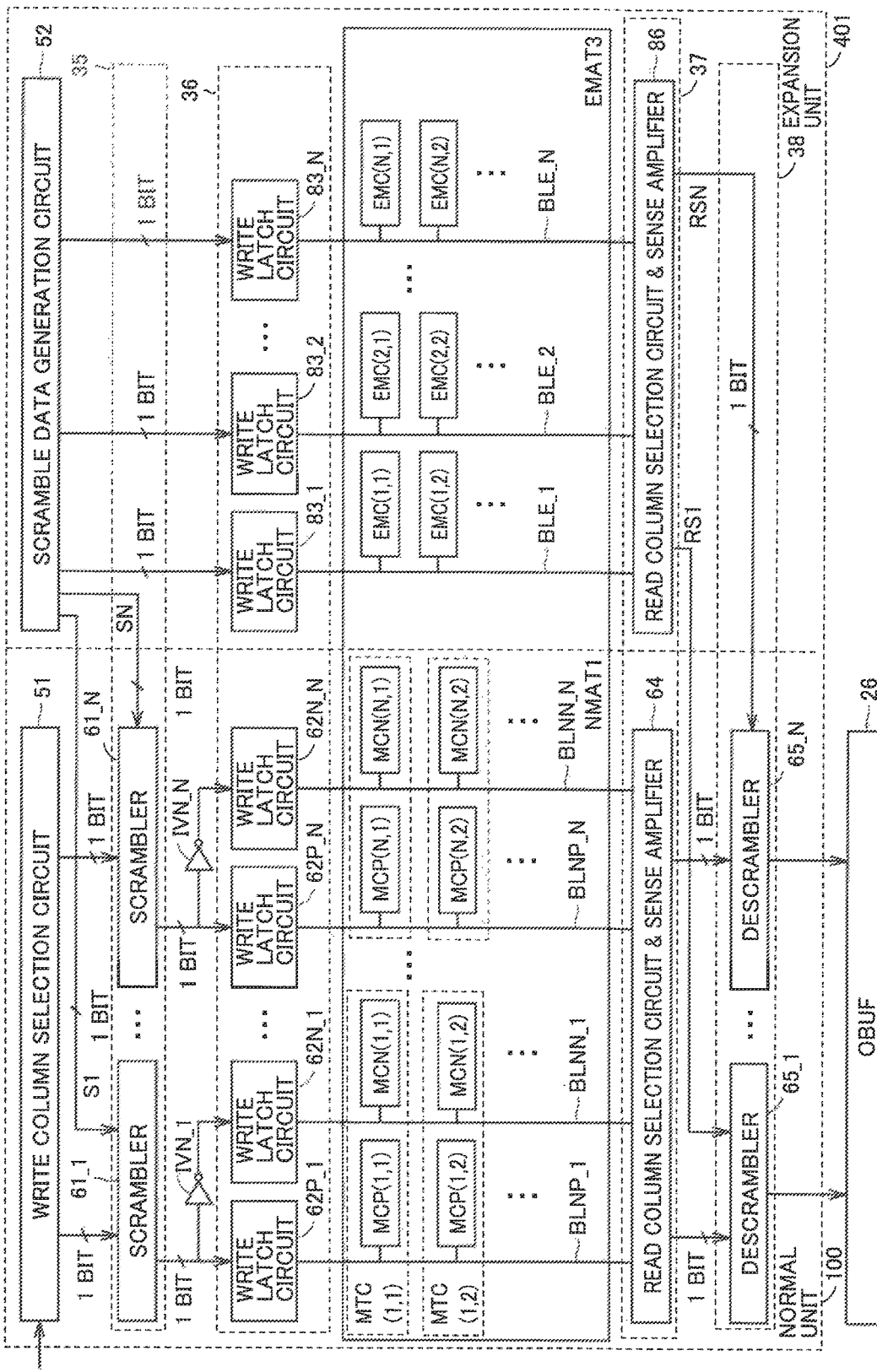
FIG. 11 is a diagram showing main components involved with write and read of twin cell data in the semiconductor device in a fifth embodiment.

FIG. 11 is a diagram showing main components involved with write and read of twin cell data in the semiconductor device in a fifth embodiment.

The semiconductor device in FIG. 11 is different from the semiconductor device in the second embodiment in FIG. 8 in the following. The semiconductor device in FIG. 8 includes 2N write latch circuits 63P_1 to 63P_N and 63N_1 to 63N_N, whereas an expansion unit 401 in FIG. 11 includes N write latch circuits 83_1 to 83_N.

Expansion mat EMAT1 in expansion unit 101 in FIG. 8 includes N×L twin cells ETC (i, j) (i is set to 1 to N and j=1 to L), whereas an expansion mat EMAT3 in expansion mat 401 in FIG. 11 includes N×L single cells EMC (i, j) (i=1 to N and j=1 to L). Single cell EMC (i, j) is connected to bit line BLE_i.

Figure 12:
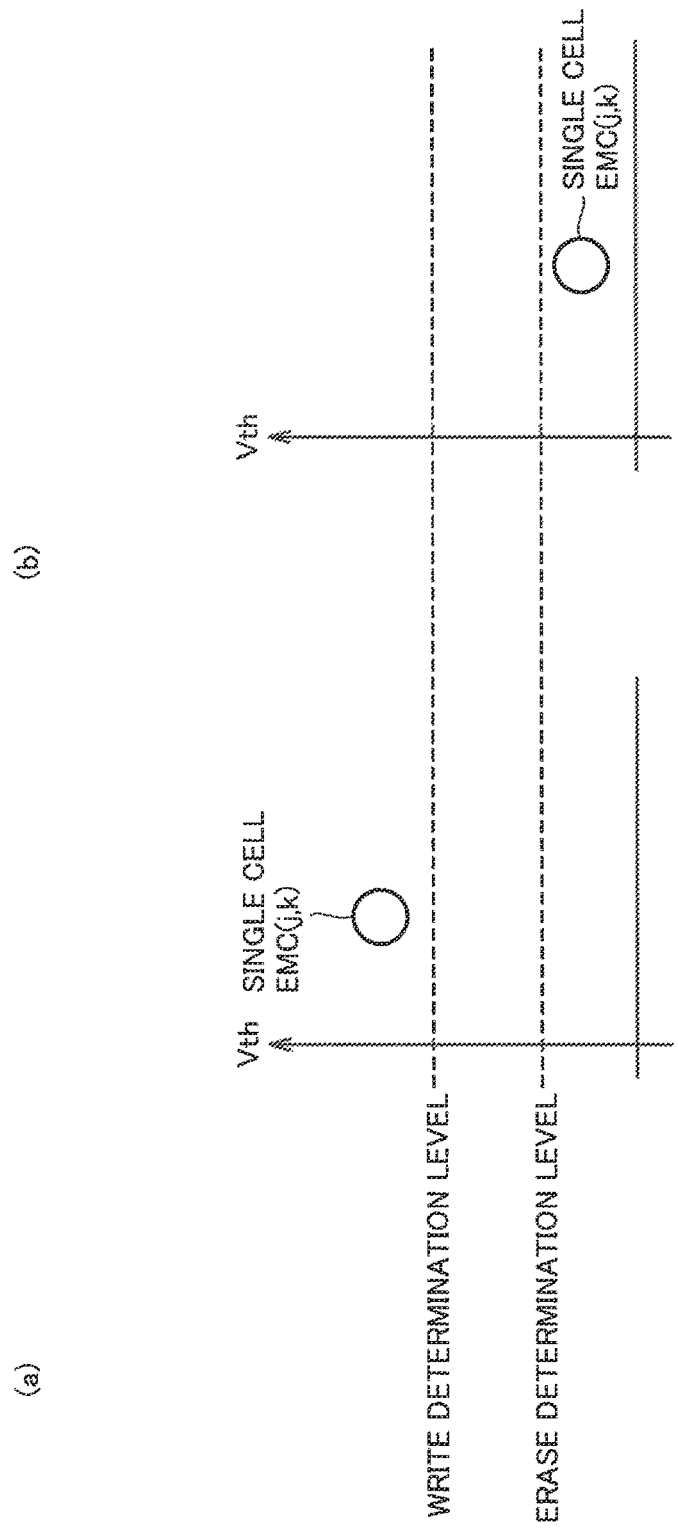
FIG. 12 is (a) a diagram showing a state that a single cell stores single cell data "0" and (b) a diagram showing a state that a single cell stores single cell data "1".

As shown in FIG. 12 (a), single cell data "0" refers to a state that a memory cell MC holds cell data "0" (a high threshold voltage state; a threshold voltage being not lower than an erase verify level). As shown in FIG. 12 (b), single cell data "1" refers to a state that memory cell MC holds cell data "1" (a low threshold voltage state; a threshold voltage being lower than the erase verify level).

Scramble data generation circuit 52 generates N-bit scramble data S1 to SN. Each bit Si is sent to write latch circuit 83_i.

Write latch circuit 83_i (i=1 to N) receives 1 bit Si of N-bit scramble data S1 to SN from scramble data generation circuit 52. When Si is "0", write latch circuit 83_i allows a write current to flow to bit line BLE_i by allowing bit line BLE_i to be connected to ground voltage Vss during a period in which write pulses WPLS are activated. Thus, threshold voltage Vth of single cell EMC (i, k) in selected row k increases and cell data "0" is written. When Si is "1", write latch circuit 83_i does not allow a write current to flow to bit line BLE_i by allowing bit line BLE_i to be connected to power supply voltage VDD. Thus, threshold voltage Vth of single cell EMC (i, k) in selected row k does not vary.

A read column selection circuit & sense amplifier 86 selects a column from which data is to be read, among a first column to an Nth column in expansion mat EMAT3. When the selected column is a column j, one input terminal of a sense amplifier of read column selection circuit & sense amplifier 66 is connected to bit line BLE_j and the other input terminal is connected to a constant current source circuit. This sense amplifier amplifies a difference in voltage between two input terminals, reads scramble data, and outputs the scramble data to descrambler 65_j.

When a row selected by first row decoder (RDEC1) 24 and second row decoder (RDEC2) 25 is a row k, scramble data RSj of single cell EMC (j, k) is output. When data of single cell EMC (j, k) is not erased after scramble data Sj is written into single cell EMC (j, k), read data RSj is equal to Sj. When data is read from single cell EMC (j, k) after data of single cell EMC (j, k) is erased, read data RSj has a fixed value "1".

As set forth above, according to the present embodiment, when write data subjected to scramble processing is written into a normal mat and not erased, the write data subjected to scramble processing and scramble data are correctly read so that the write data can normally be restored through descramble processing.

When write data subjected to scramble processing is written into a normal mat and erased, scramble data is also erased from an expansion mat. Though the write data subjected to scramble processing before erase may be read in this state, scramble data before erase is not read (the fixed value "1" is read). Therefore, restoration of write data through descramble processing can be avoided.

Sixth Embodiment

Figure 13:
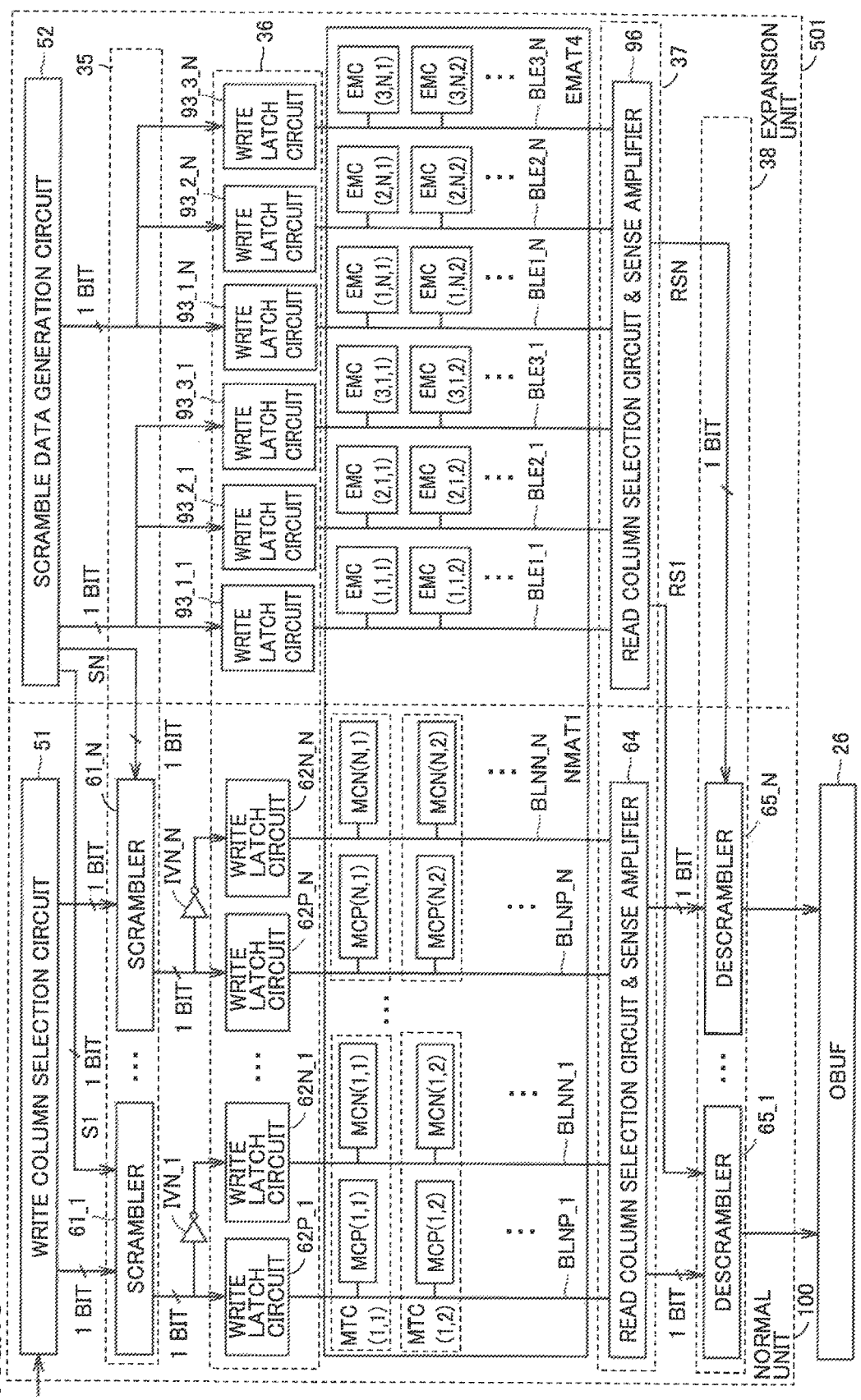
FIG. 13 is a diagram showing main components involved with write and read of twin cell data in the semiconductor device in a sixth embodiment.

FIG. 13 is a diagram showing main components involved with write and read of twin cell data in the semiconductor device in a sixth embodiment.

The semiconductor device in FIG. 13 is different from the semiconductor device in the second embodiment in FIG. 8 in the following. The semiconductor device in FIG. 8 includes 2N write latch circuits 63P_1 to 63P_N and 63N_1 to 63N_N, whereas an expansion unit 501 in FIG. 13 includes 3N write latch circuits 93_1_1 to 93_1_N, 93_2_1 to 93_2_N, and 93_3_1 to 93_3_N.

Expansion mat EMAT1 in expansion unit 101 in FIG. 8 includes N×L twin cells ETC (i, j) (i is set to 1 to N and j=1 to L), whereas an expansion mat EMAT4 in expansion unit 501 in FIG. 13 includes 3N×L single cells EMC (s, i, j) (s=1 to 3, i=1 to N, and j=1 to L). Single cell EMC (s, i, j) is connected to bit line BLEs_i.

Scramble data generation circuit 52 generates N-bit scramble data S1 to SN. Each bit Si is sent to write latch circuits 93_1_i, 93_2_i, and 93_3_i.

Write latch circuits 93_1_i, 93_2_i, and 93_3_i receive 1 bit Si of N-bit scramble data S1 to SN from scramble data generation circuit 52. When Si is "0", write latch circuits 93_1_i, 93_2_i, and 93_3_i allow a write current to flow to bit lines BLE1_i, BLE2_i, and BLE3_i by allowing bit lines BLE1_i, BLE2_i, and BLE3_i to be connected to ground voltage Vss during a period in which write pulses WPLS are activated. Thus, threshold voltage Vth of memory cells EMC (1, i, k), EMC (2, i, k), and EMC (3, i, k) in selected row k increases and cell data "0" is written.

When Si is "1", write latch circuits 93_1_i, 93_2_i, and 93_3_i do not allow a write current to flow to bit lines BLE1_i, BLE2_i, and BLE3_i by allowing bit lines BLE1_i, BLE2_i, and BLE3_i to be connected to power supply voltage VDD. Thus, threshold voltage Vth of memory cells EMC (1, i, k), EMC (2, i, k), and EMC (3, i, k) in selected row k does not vary.

Figure 14:
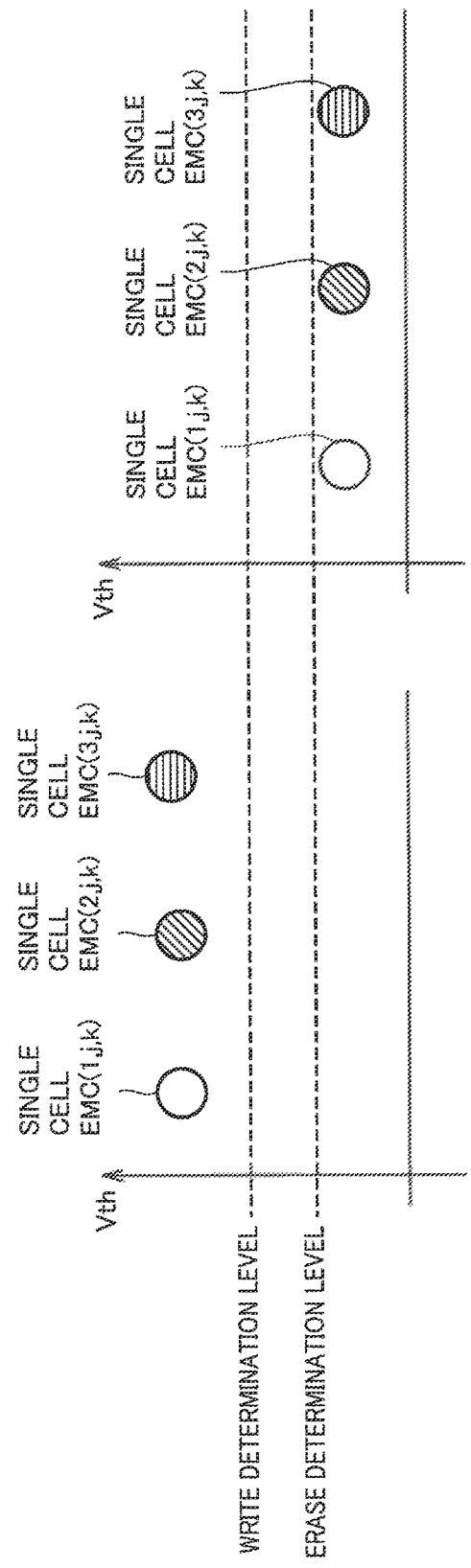
FIG. 14 is (a) a diagram showing a state that three single cells store single cell data "0" and (b) a diagram showing a state that three single cells store single cell data "1".

As shown in FIG. 14 (*a*), when stored Si is "0", memory cells EMC (1, i, k), EMC (2, i, k), and EMC (3, i, k) hold cell data "0" (a high threshold voltage state; a threshold voltage being not lower than an erase verify level). As shown in FIG. 14 (*b*), when stored Si is "1", memory cells EMC (1, i, k), EMC (2, i, k), and EMC (3, i, k) hold cell data "1" (a low threshold voltage state; a threshold voltage being lower than the erase verify level).

A read column selection circuit & sense amplifier 96 selects a column from which data is to be read, among a first column to an Nth column in expansion mat EMAT4.

Figure 15:
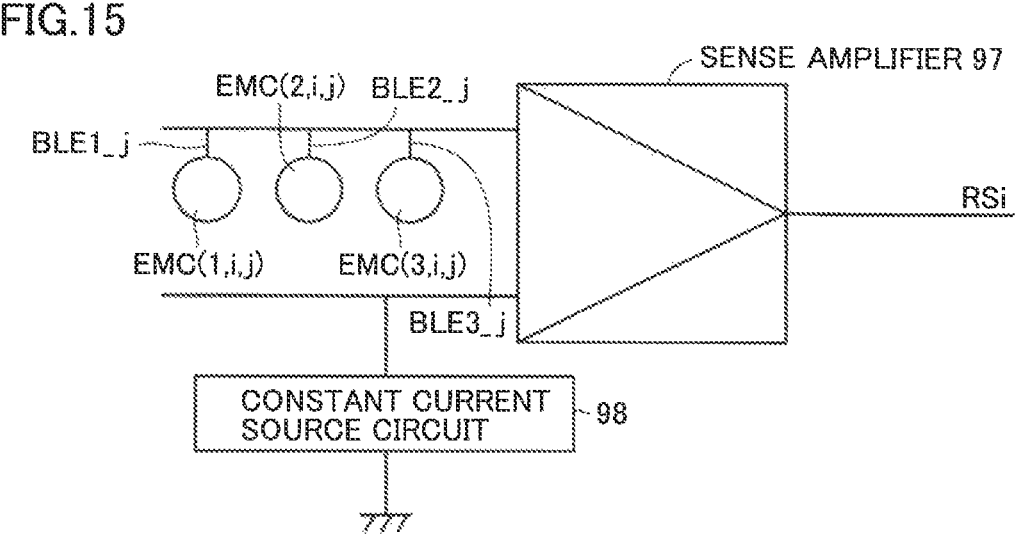
FIG. 15 is a diagram showing a sense amplifier included in a read column selection circuit & sense amplifier.

FIG. 15 is a diagram showing a sense amplifier 97 in read column selection circuit & sense amplifier 96. When a selected column is a column j, one input terminal of sense amplifier 97 is connected to bit lines BLE1_j, BLE2_j, and BLE3_j and the other input terminal is connected to a constant current source circuit 98. Sense amplifier 97 amplifies a difference in voltage between two input terminals, reads scramble data, and outputs the scramble data to descrambler 65_j.

In the present embodiment, even when data retention characteristics of any memory cell of the three memory cells are poor and a threshold voltage lowers, a total value of currents from three memory cells and the sum of a current from constant current source circuit 98 are compared with each other so that a read margin can be ensured. Therefore, a constant current output from constant current source circuit 98 is set to a value in consideration of the read margin.

When a row selected by first row decoder (RDEC1) 24 and second row decoder (RDEC2) 25 is a row k, scramble data RSj of single cells EMC (1, j, k), EMC (2, j, k), and EMC (3, j, k) is output. When data of single cells EMC (1, j, k), EMC (2, j, k), and EMC (3, j, k) is not erased after scramble data Sj is written into single cells EMC (1, j, k), EMC (2, j, k), and EMC (3, j, k), read data RSj is equal to Sj. When data is read from single cells EMC (1, j, k), EMC (2, j, k), and EMC (3, j, k) after data of single cells EMC (1, j, k), EMC (2, jk), and EMC (3, j, k) is erased, read data RSj has a fixed value "1".

As set forth above, according to the present embodiment, when write data subjected to scramble processing is written into a normal mat and not erased, the write data subjected to scramble processing and scramble data are correctly read so that the write data can normally be restored through descramble processing. Here, capability to hold scramble data in an expansion mat can be higher than in the fifth embodiment.

When write data subjected to scramble processing is written into a normal mat and erased, scramble data is also erased from an expansion mat. Though the write data subjected to scramble processing before erase may be read in this state, scramble data before erase is not read (the fixed value "1" is read). Therefore, restoration of write data through descramble processing can be avoided.

Seventh Embodiment

Figure 16:
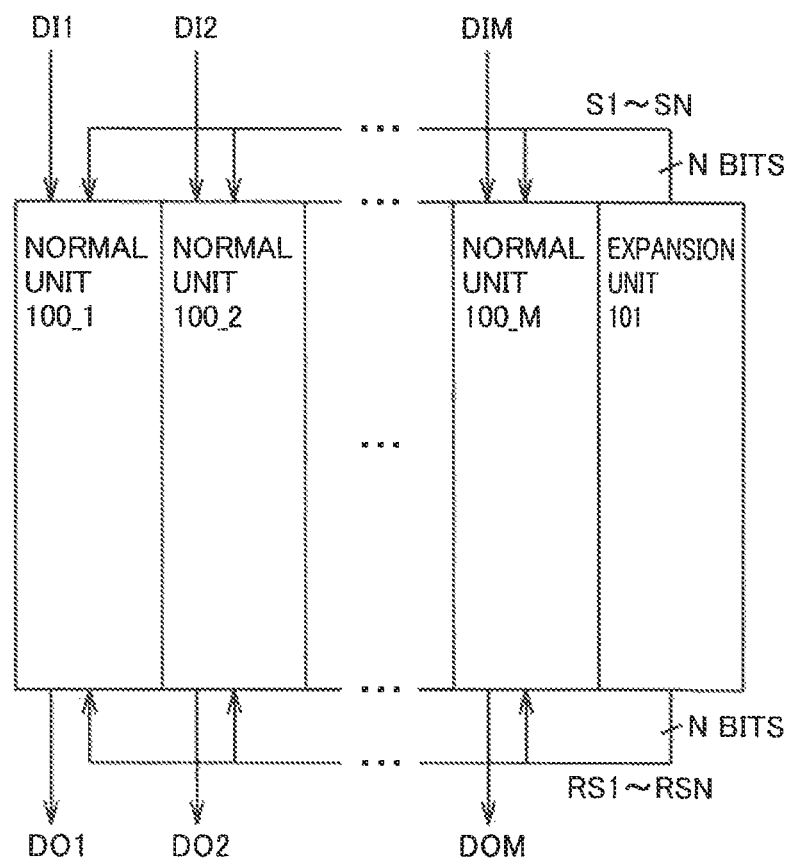
FIG. 16 is a diagram showing a configuration of a normal unit and an expansion unit in a seventh embodiment.

FIG. 16 is a diagram showing a configuration of a normal unit and an expansion unit in a seventh embodiment.

As shown in FIG. 16, a semiconductor device in the present embodiment includes M normal units 100 in the second embodiment in FIG. 8 (normal units 100_1 to 100_M).

Namely, N-bit scramble data S1 to SN generated by scramble data generation circuit 52 in expansion unit 101 is sent to scramblers 61_1 to 61_N in each of M normal units 100_1 to 100_M. Read N-bit scramble data RS1 to RSN output from read column selection circuit & sense amplifier 66 in expansion unit 101 is sent to descramblers 65_1 to 65_N in each of M normal units 100_1 to 100_M.

Here, a normal unit 100_i corresponds to a data input pin DIi of M data input pins DI1 to DIM and a data output pin DOi of M data output pins DO1 to DOM.

M normal units 100_1 to 100_M carry out simultaneous write of M-bit write data from M data input pins DI1 to DIM and M normal units 100_1 to 100_M carry out simultaneous reading, to thereby output read M-bit data from M data output pins DO1 to DOM.

As set forth above, in the present embodiment, N-bit scramble data is applied to write data in N×M columns in the normal unit and therefore an area of an expansion mat can be made smaller than in the second embodiment.

Modification of Seventh Embodiment

Figure 17:
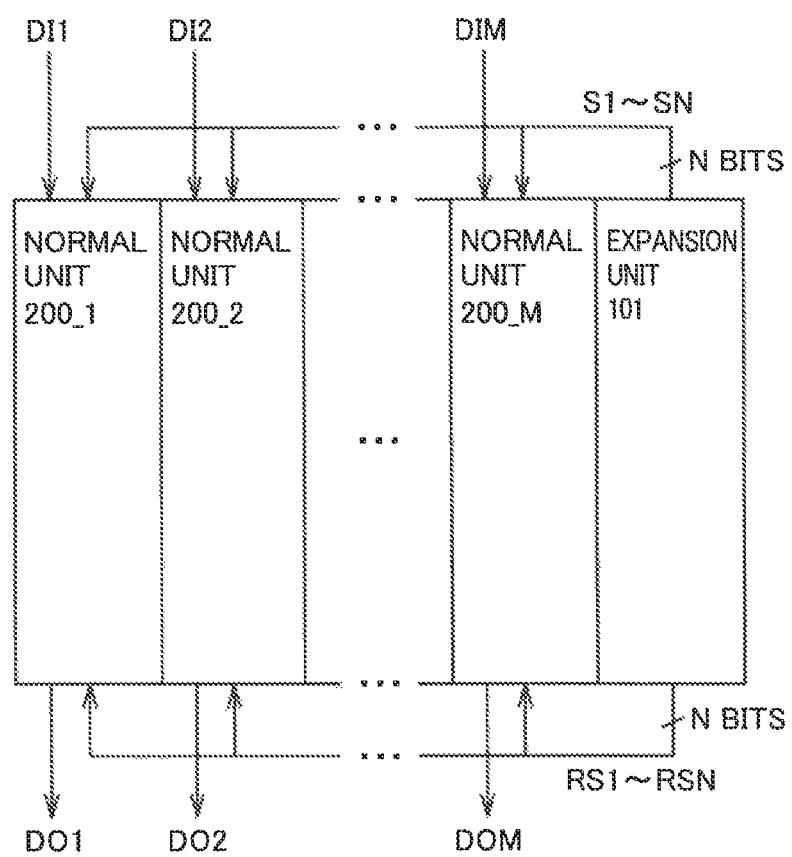
FIG. 17 is a diagram showing a configuration of a normal unit and an expansion unit in a modification of the seventh embodiment.

FIG. 17 is a diagram showing a configuration of a normal unit and an expansion unit in a modification of the seventh embodiment.

As shown in FIG. 17, a semiconductor device in the present modification includes M normal units 200 (normal units 200_1 to 200_M) in the third embodiment in FIG. 9.

Namely, N-bit scramble data S1 to SN generated by scramble data generation circuit 52 in expansion unit 101 is sent to M normal units 200_1 to 200_M. Read N-bit read scramble data RS1 to RSN output from read column selection circuit & sense amplifier 66 in expansion unit 101 is sent to descrambler 75 in each of M normal units 200_1 to 200_M.

Here, as in the seventh embodiment, normal unit 200_i corresponds to data input pin DIi of M data input pins DI1 to DIM and data output pin DOi of M data output pins DO1 to DOM.

M normal units 200_1 to 200_M carry out simultaneous write of M-bit write data from M data input pins DI1 to DIM and M normal units 200_1 to 200_M carry out simultaneous reading, to thereby output read M-bit data from M data output pins DO1 to DOM.

As set forth above, in the present modification, N-bit scramble data is applied to write data in N×M columns in the normal unit, and therefore an area of an expansion mat can be made smaller than in the third embodiment.

Eighth Embodiment

Figure 18:
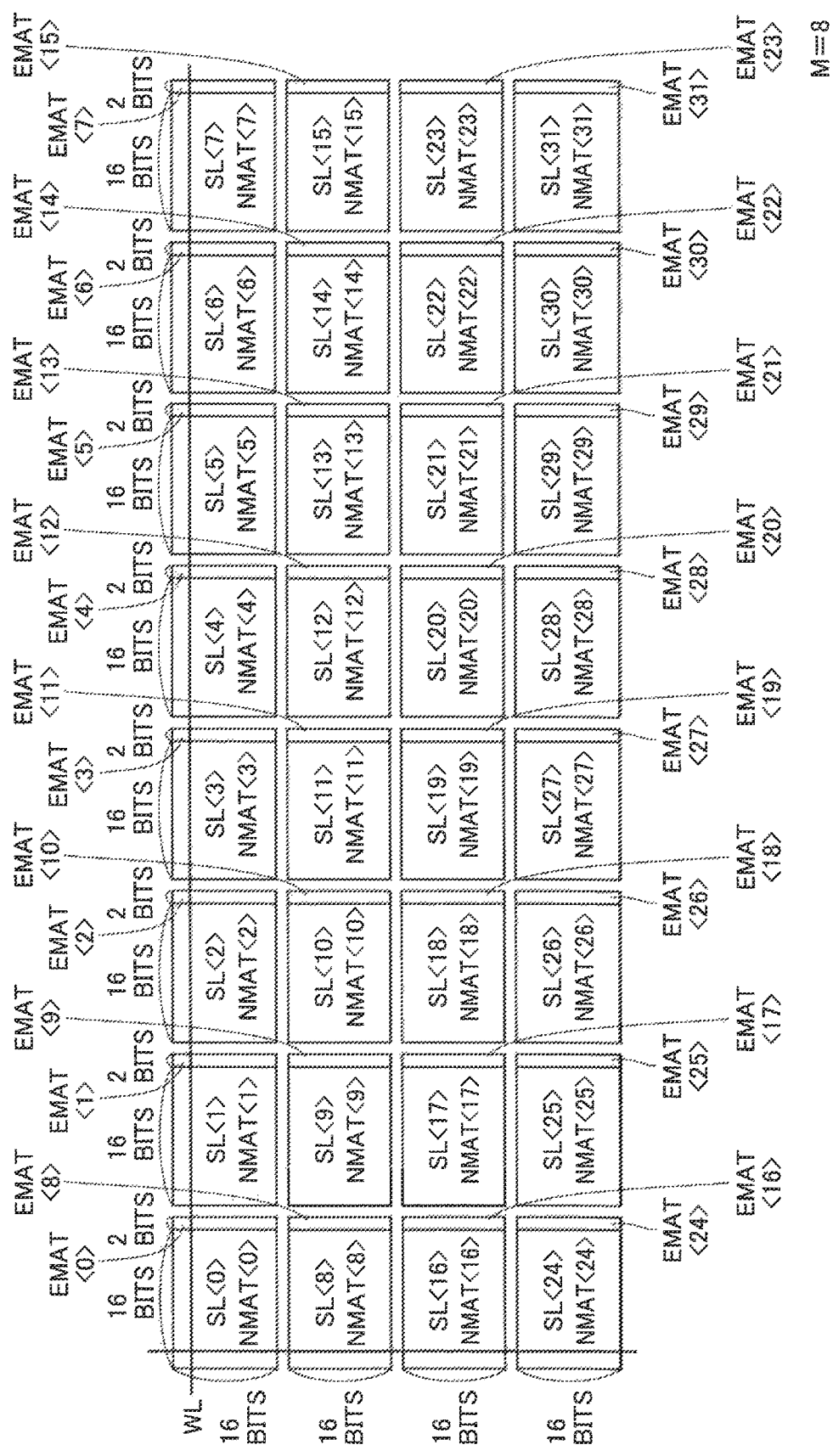
FIG. 18 is a diagram showing 1 erase block configuration of a memory array in an eighth embodiment.

FIG. 18 is a diagram showing 1 erase block configuration of a memory array in an eighth embodiment.

One erase block is constituted of a normal mat and an expansion mat. The normal mat in 1 erase block is divided into sub blocks NMAT <0> to NMAT <31>. An expansion mat in 1 erase block is divided into sub blocks EMAT <0> to EMAT <31>.

Sub block NMAT <i> in the normal mat and sub block EMAT <i> in the expansion mat are arranged adjacently to each other. By way of example, scramble data stored in sub block EMAT <i> in the expansion mat may be used for scramble processing and descramble processing of write data into sub block NMAT <i> in the normal mat. Alternatively, a part of scramble data stored in sub block EMAT <i> in the expansion mat may be used for scramble processing and descramble processing of write data into sub block NMAT <i> in the normal mat and the remainder may be used for scramble processing and descramble processing of write data into a sub block EMAT <j> (j≠i) in other one or more normal mats.

A memory cell in sub block NMAT <i> in the normal mat and a memory cell in sub block EMAT <i> in the expansion mat are connected to a common source line SL <i> and erase in these memory cells is carried out at the same timing.

Figure 19:
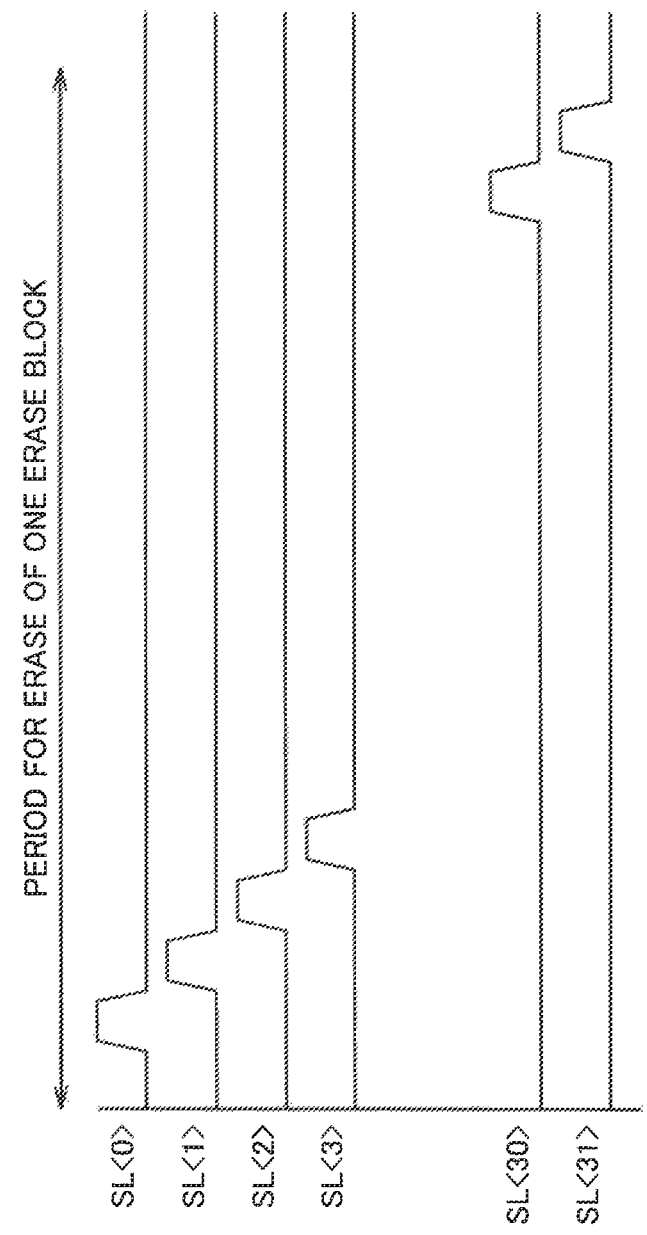
FIG. 19 is a diagram showing activation timing of a plurality of source lines in the eighth embodiment.

As shown in FIG. 19, initially, a source line SL <0> is activated and memory cells in sub block NMAT <0> in the normal mat and sub block EMAT <0> in the expansion mat are first erased.

Then, a source line SL <1> is activated and memory cells in sub block NMAT <1> in the normal mat and sub block EMAT <1> in the expansion mat are erased.

Finally, a source line SL <31> is activated and memory cells in sub block NMAT <31> in the normal mat and sub block EMAT <31> in the expansion mat are erased.

As set forth above, according to the present embodiment, expansion mats are arranged in a physically distributed manner, and hence such a problem as increase in number of bits to be erased only in specific time-division erase caused at the time when expansion mats are arranged in a physically concentrated manner or necessity for additional time-division erase of an expansion mat can be avoided.

The present invention is not limited to the embodiments above, and also includes, for example, a modification as below.

(1) Switching Control

The semiconductor device in the embodiments of the present invention performs scramble processing of write data during write and descramble processing of read data during reading, however, the present invention is not limited to processing in the first stage.

For example, the semiconductor device may include both of a function of normal write and read and a function of write accompanying scramble processing and read accompanying descramble processing, and can switch which function is to be executed.

Though the invention made by the present inventor has specifically been described based on the embodiments, the present invention is not limited to the embodiments but can naturally be modified variously within the scope without departing from the gist thereof.

REFERENCE SIGNS LIST

1 microcomputer (MCU); 2 central processing unit (CPU); 3 direct memory access controller (DMAC); 4 bus interface circuit (BIT); 5 random access memory (RAM); 6 flash memory module (FMDL); 7 flash sequencer (FSQC); 8, 9 external input/output port (PRT); 10 timer (TMR); 11 clock pulse generator (CPG); 19 memory array (MARY); 24 first row decoder (RDEC1); 25 second row decoder (RDEC2); 29 input/output circuit (IOBUF); 30 column decoder (CDEC); 31 power supply circuit (VPG); 32 timing generator (TMG); 33 verify unit; 34 write column selection unit; 35, 501 scramble unit; 36 write latch unit; 37 column selection & amplification unit; 38, 504 descramble unit; 51 write column selection circuit; 52 scramble data generation circuit; 61_1 to 61_N, 71 scrambler; 62P_1 to 62P_N, 62N_1 to 62N_N, 63P_1 to 63P_N, 63N_1 to 63N_N, 73P1_1 to 73P1_N, 73P2_1 to 73P2_N, 73P3_1 to 73P3_N, 73N1_1 to 73N1_N, 73N2_1 to 73N2_N, 73N3_1 to 73N3_N, 83_1 to 83_N, 93_1_1 to 93_1_N, 93_2_1 to 93_2_N, 93_3_1 to 93_3_N write latch circuit; 64, 66 read column selection circuit & sense amplifier; 65_1 to 65_N, 75 descrambler; 97 sense amplifier; 98 constant current source circuit; 100, 100_1 to 100_M, 200, 200_1 to 200_M normal unit; 101, 301, 401, 501 expansion unit; NMAT1, NMAT <0> to NMAT <31> normal mat; EMAT1, EMAT2, EMAT3, EMAT4, EMAT <0> to EMAT <31> expansion mat; 500 semiconductor device; 502 first storage unit; 503 second storage unit; 506, 507, 510, MCP (i, j), MCN (i, j), EMCP (i, j), EMCN (i, j), EMC (i, j), EMC (s, i, j), EMCP (s, i, j), EMCN (s, i, j) memory cell; 505, MTC (i, j), ETC (i, j), ETC (s, i, j) twin cells; 509, 511 write unit; BLNP_1 to BLNP_N, BLNN_1 to BLNN_N, BLEP_1 to BLEP_N, BLEN_1 to BLEN_N, BLE_1 to BLE_N bit line; IVN_1 to IVN_N, IVE_1 to IVE_N inverter; PBUS_D peripheral data bus; DI0 to DIM data input pin; and DO0 to DOM data output pin.

The invention claimed is:

1. A semiconductor device, comprising:
   a first storage unit including twin cells which are electrically rewritable and complementarily store 1-bit data based on a difference in a threshold voltage;
   a second storage unit including a memory cell which is electrically rewritable, data stored in the memory cell being erased when data in the twin cells is erased;
   at least one scrambler subjecting first data to a scramble processing by using scramble data to generate second data;
   a first write circuit which writes the second data into the twin cells in the first storage unit;
   a second write circuit which writes the scramble data into the memory cell in the second storage unit; and
   at least one descrambler subjecting the second data read from the first storage unit to a descramble processing by using the scramble data read from the second storage unit,
   wherein the second storage unit includes a plurality of single cells each consisting of one memory cell and storing 1 bit of the scramble data, and the plurality of single cells redundantly store 1 bit of the scramble data, and wherein the semiconductor device further comprises a sense amplifier including one input terminal simultaneously connected to a plurality of bit lines connected to the plurality of single cells and another terminal connected to a constant current source circuit.

2. A semiconductor device, including:
a first storage unit including twin cells which are electrically rewritable and complementarily store 1-bit data based on a difference in a threshold voltage;
a second storage unit including a memory cell which is electrically rewritable, data stored in the memory cell being erased when data n the twin cells is erased;
at least one scrambler subjecting first data to a scramble processing by using scramble data to generate second data;
a first write circuit which writes the second data into the twin cells in the first storage unit;
a second write circuit which writes the scramble data into the memory cell in the second storage unit; and
at least one descrambler subjecting the second data read from the first storage unit to a descramble processing by using the scramble data read from the second storage unit,
wherein the second storage unit includes a plurality of sets of twin cells each including two memory cells and storing 1 bit of the scramble data, and the plurality of sets of twin cells redundantly store 1 bit of the scramble data, and
wherein the semiconductor device further comprises a determination circuit which sends, when values for 1 bit read from the plurality of sets of twin cells are all identical, an identical value to the at least one descrambler, and sends, when there is a value for 1 bit different from other values for 1 bit read from the plurality of sets of twin cells, a value lower in frequency to the at least one descrambler.

3. A semiconductor device, comprising:
a first storage unit including twin cells which are electrically rewritable and complementarily store 1-bit data based on a difference in a threshold voltage;
a second storage unit including a memory cell which is electrically rewritable, data stored in the memory cell being erased when data in the twin cells is erased;
at least one scrambler subjecting first data to a scramble processing by using scramble data to generate second data;
a first write circuit which writes the second data into the twin cells in the first storage unit;
a second write circuit which writes the scramble data into the memory cell in the second storage unit; and
at least one descrambler subjecting the second data read from the first storage unit to a descramble processing by using the scramble data read from the second storage unit,
wherein the at least one scrambler includes a plurality of scramblers provided for respective columns in the first storage unit,
wherein each of the plurality of scramblers subjects write data of 1 bit into twin cells in a corresponding column to the scramble processing by using the scramble data,
wherein the at least one descrambler includes a plurality of descramblers provided for respective columns in the first storage unit, and
wherein each of the plurality of descramblers subjects the data of 1 bit read from the twin cells in the corresponding column to the descramble processing by using the scramble data read from the second storage unit.

4. The semiconductor device according to claim 3, wherein the scramble data includes a plurality of bits,
wherein each of the plurality of scramblers subjects write data of I bit into the twin cells in the corresponding column to the scramble processing by using 1 bit corresponding to the column among the plurality of bits constituting the scramble data, and
wherein each of the plurality of descramblers subjects the data of I bit read from the twin cells in the corresponding column to the descramble processing by using the 1 bit corresponding to the column among the plurality of bits constituting the scramble data.

5. A semiconductor device, comprising:
a first storage unit including twin cells which are electrically rewritable and complementarily store 1-bit data based on a difference in a threshold voltage;
a second storage unit including a memory cell which is electrically rewritable, data stored in the memory cell being erased when data in the twin cells is erased;
at least one scrambler subjecting first data to a scramble processing by using scramble data to generate second data;
a first write circuit which writes the second data into the twin cells in the first storage unit;
a second write circuit which writes the scramble data into the memory cell in the second storage unit; and
at least one descrambler subjecting the second data read from the first storage unit to a descramble processing by using the scramble data read from the second storage unit,
wherein the at least one scrambler includes a scrambler commonly provided for a plurality of columns in the first storage unit,
wherein the scrambler subjects write data of 1 bit into the twin cells to the scramble processing by using the scramble data,
wherein the at least one descrambler includes a descrambler commonly provided for a plurality of columns in the first storage unit, and
wherein the descrambler subjects the data of 1 bit read from the twin cells to the descramble processing by using the scramble data read from the second storage unit.

6. The semiconductor device according to claim 5, wherein the scramble data includes a plurality of bits,
wherein the scrambler subjects write data of 1 bit into the twin cells to the scramble processing by using 1 bit corresponding to a column of the twin cells among the plurality of bits constituting the scramble data, and
wherein the descrambler subjects the data of 1 bit read from the twin cells to the descramble processing by using the 1 bit corresponding to the column of the twin cells among the plurality of bits constituting the scramble data.

7. The semiconductor device according to claim 5, further comprising:
a plurality of sets of a data input pin and a data output pin; and
the scrambler and the descrambler for each set of the data input pin and the data output pin,
wherein a plurality of the scramblers perform the scramble processing by using identical scramble data, and a plurality of the descramblers perform the descramble processing by using the identical scramble data.

* * * * *